(12) United States Patent
Nakajima et al.

(10) Patent No.: US 6,395,355 B1
(45) Date of Patent: May 28, 2002

(54) WEATHER STRIP

(75) Inventors: Takao Nakajima, Inazawa; Masanori Aritake, Ichinomiya; Haruhisa Kawase, Nagoya; Hisao Hanabusa, Bisai; Masahiro Takaya, Hashima-gun, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/181,670

(22) Filed: Oct. 29, 1998

(30) Foreign Application Priority Data

Oct. 30, 1997 (JP) ............................................. 9-316032
Dec. 26, 1997 (JP) ............................................. 9-368537
Jul. 31, 1998 (JP) ........................................... 10-230230

(51) Int. Cl.[7] ............................................... E06B 7/16
(52) U.S. Cl. ................... 428/34.1; 428/36.92; 428/122; 428/192; 428/908.8
(58) Field of Search ...................... 49/490.1, 498.1; 428/34.1, 36.92, 122, 192, 908.8

(56) References Cited

U.S. PATENT DOCUMENTS

| 3,837,957 A | * | 9/1974 | Mesnel ........................ 156/221 |
| 4,708,898 A | * | 11/1987 | Gommier et al. .............. 428/36 |
| 4,769,947 A | * | 9/1988 | Ogawa et al. ................. 49/479 |
| 4,884,370 A | | 12/1989 | Nozaki et al. |
| 4,977,706 A | * | 12/1990 | Kisanuki ..................... 49/479 |
| 5,035,937 A | | 7/1991 | Nozaki |
| 5,127,193 A | * | 7/1992 | Okada et al. ................. 49/495 |
| 5,258,157 A | | 11/1993 | Nozaki et al. |
| 5,269,101 A | | 12/1993 | Nozaki et al. |
| 5,296,067 A | * | 3/1994 | Mesnel et al. ............... 156/221 |
| 5,437,124 A | * | 8/1995 | Ahlfeld et al. .............. 49/479.1 |
| 5,538,578 A | * | 7/1996 | Sugawara et al. ........... 156/245 |
| 5,581,950 A | * | 12/1996 | Nakamura .................. 49/475.1 |
| 5,618,608 A | * | 4/1997 | Teishi ......................... 428/122 |
| 5,972,268 A | * | 10/1999 | Nakajima et al. ........... 264/138 |

* cited by examiner

Primary Examiner—Blaine Copenheaver
Assistant Examiner—Alicia Chevalier
(74) Attorney, Agent, or Firm—Pillsbury Winthrop LLP

(57) ABSTRACT

A weather strip comprising an extruded body having straight sections and a corner section curving therebetween is disclosed. The extruded body comprises an attachment portion and a hollow sealing portion integrally formed by extrusion molding. The attachment portion is attached to a part of an automobile and the sealing portion is connected to the attachment portion at both ends. The weather strip comprises: an incision slit made on the outer periphery of the sealing portion in the corner section; an incision edge formed on the sealing portion along the incision slit, the incision edge being spread out toward the outer periphery of the corner section with the attachment portion and sealing portion being curved along a corner shape of the part of the automobile; and a molded part formed at least in the vicinity of the incision edge on the back side of the sealing portion in the corner section.

16 Claims, 30 Drawing Sheets

F I G. 1 3
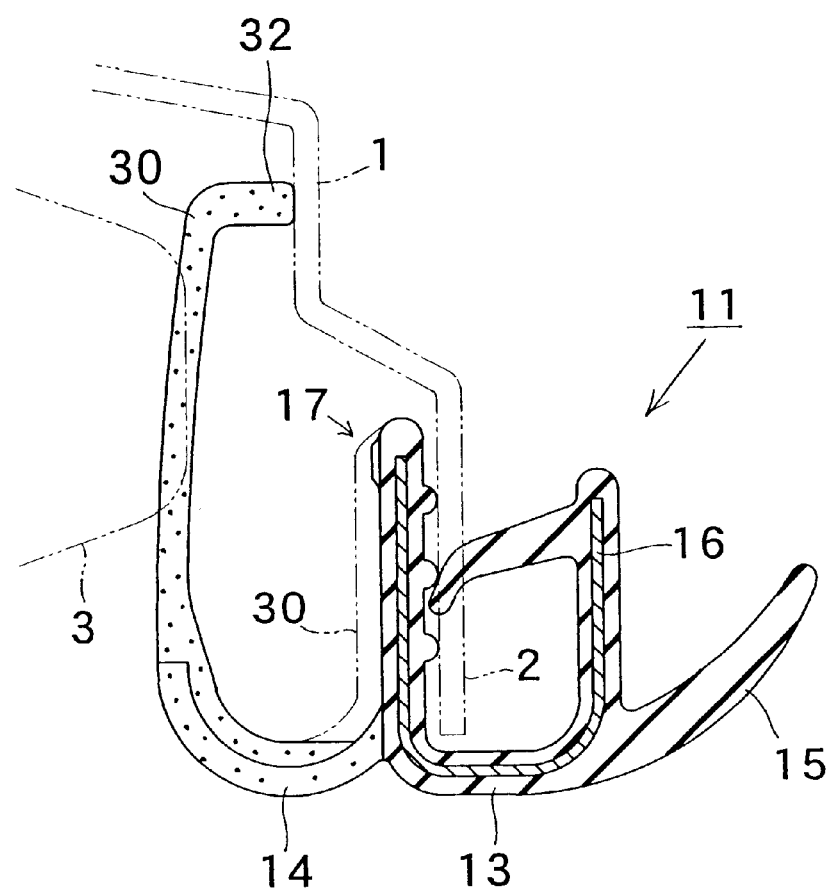

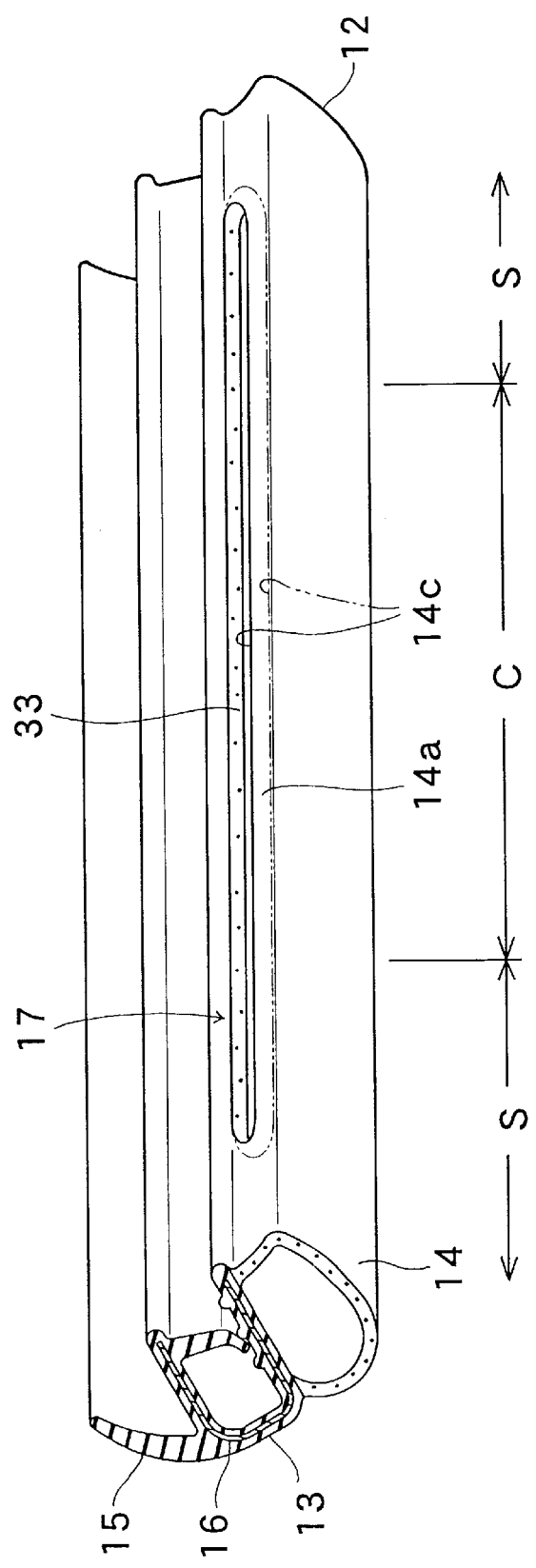

WEATHER STRIP

BACKGROUND OF THE INVENTION

1. Field of the Invention

This invention relates to a weather strip having a curved corner section. Examples of such a weather strip including an opening trim attach to an opening peripheral edge of an automobile body. The opening is open and closed with a panel such as a side door panel, a hatchback door panel, a trunk panel, a quarter window panel and a sliding roof of the automobile. The weather strip is attached to one of such opening peripheral edge and open and closed panels.

2. Description of Related Art

According to the first conventional weather strip as shown in FIG. 23, an opening trim (weather strip) 51 is attached to a flange 2 of an opening peripheral edge of an automobile body 1, which seals a gap between the body 1 and a door panel 3 when the door panel 3 is closed. The opening trim 51 is mainly composed of an extruded product 52, as shown in FIGS. 24 and 25. The extruded product 52 is formed by common extrusion from a solid rubber, which forms an attachment portion 53 and a lip portion 55, and a sponge rubber, which forms a hollow (loop-shaped) sealing portion 54. The attachment portion 53 has a metal reinforcing insert 56 embedded therein. The sealing portion 54 is connected to the attachment portion 53 at both ends of the loop.

Since the opening trim 51 is required to be curved along a corner of the door opening peripheral edge, it has a corner section C which curves between straight sections S, S. In order to form the corner section C where this curved shape is maintained, the sealing portion 54 in the corner section C is first cut off remaining its inner peripheral part 54a, as shown in FIG. 24. Next, the extruded product 52 is set in a molding apparatus (not shown) with being curved at the corner section C, and a sponge rubber material is injected into the cut off part of the sealing portion 54, thereby forming a molded part 57, as shown in FIG. 25. At this time, the molded part 57 is connected to the remaining inner peripheral part 54a. In order to expand the sealing area of the corner section C toward its outer periphery according to the corner shape of the door panel 3, the molded part 57 is formed so as to project toward the outer periphery of the corner section C. In FIG. 25, cross-hatching lines are shown only to make the range of the molded part 57 clear.

However, since the sealing portion 54 in the corner section C is almost cut off and replaced by the molded part 57, the range of the molded part 57 becomes large, which brings a problem in the appearance and durability of the resulting opening trim 51.

Namely, even if the same kind of sponge rubber material is used for the sealing portion 54 of the extruded product 52 and the sealing portion of the molded part 57, they are different from each other in luster on their surfaces due to the difference in their forming method and a slight difference in their material and expansion ratio, and a borderline 58 is seen between them, which impairs the appearance of the corner section C. Furthermore, since the sealing portion 54 of the extruded product 52 and the sealing portion of the molded part 57 are different from each other in their state of deterioration, which is brought by the contact with the door panel 3, their difference in luster on their surfaces becomes greater with the passage of time.

In addition, the molded part 57 is formed from a molding material whose composition shows a good fluidity in a cavity, so the sealing portion of the resulting molded part 57 is rather soft. As a result, there also is a problem that the sealing portion of the molded part 57 is inferior to the sealing portion 54 of the extruded product 52 in the durability.

According to the second conventional weather strip as shown in FIGS. 30 to 32, an opening trim 151 is attached to a flange 102 of an opening peripheral edge of an automobile body 101, which seals a gap between the body 101 and a door panel 103 when the door panel 103 is closed. The opening trim 151 is mainly composed of an extruded rubber product 152 except for a molded part. The extruded rubber product 152 is formed by common extrusion from a solid rubber, which forms an attachment portion 153 and a lip portion 155, and a sponge rubber, which forms a hollow sealing portion 154. The attachment portion 153 has a metal reinforcing insert 156 having a U-shaped cross-section. The attachment portion 153 has a cover layer 161 for surface decoration, which extends from the boundary with the sealing portion 154 of the attachment portion 153 to the back side of the lip portion 155 via its tip edge. The cover layer 161 may be a cloth, a synthetic resin seat or a molded material from a coloring resin.

At a corner section 152a of the extruded rubber product 152, a molded part 157, which has a curved configuration and has a projecting part extending toward the outer peripheral side over the outer peripheral outline of the attachment portion 153 in accordance with the corner shape of the door panel 103, is provided. In order to form the molded part 157, the sealing portion 154 in the corner section 152a is first cut off remaining its inner and outer peripheral parts 154a and 154b. These parts 154a and 154b form inner and outer peripheries of the extruded rubber product 152 when the product 152 is curved, respectively. Next, the extruded rubber product 152 is set in a metal mold with being curved to accord with the corner shape of the door panel 103, and a sponge rubber is injected into the cut off part of the sealing portion 154, thereby forming a molded part 157.

However, once the extruded rubber product 152 is removed from the mold after the molded part 157 is formed as shown in FIG. 33, the corner section 152a, which has been curved until then, almost recovers its straight shape by the shape recovery force of the insert 156 as shown in FIG. 34. This requires operators who assembles the opening trim 151 onto an automobile body to curve the corner section 152a again with their hands so as it to accord with the corner shape of the door panel 103, which is bothersome.

Moreover, when the corner section 152a recovers its straight shape, hems 157a on the both sides of the projecting part of the molded part 157 are loosened, thereby transforming the projecting part into wavy shape. If a long period of time passes with the projecting part being transformed into wavy shape, the wavy shape remains in the projecting part, which deteriorates a sealing ability and appearance of the projecting part.

Furthermore, since the molded part 157 is formed from a sponge rubber, a heated metal mold is used to vulcanize the rubber. To prevent the heat from the heated metal mold from melting the surface of the cover layer 161, the remaining inner peripheral part 154a of the sealing portion 154, which is connected with the molded part 157, is required to be large so as to be used as a heat insulator for preventing heat transfer from the heated metal mold to the surface of the cover layer 161. For this purpose, the boundary where the inner peripheral part 154a connects with the molded part 157 is easily seen from outside, which impairs the appearance.

Furthermore, since the projecting part of the molded part 157 ends in a free edge, it is easy to be turned over or swayed by the open and closed of the door panel or its aged deterioration, which deteriorates a sealing ability and appearance of the projecting part.

SUMMARY OF THE INVENTION

It is, therefore, an object of this invention to provide a weather strip which can provide an uniform luster on its surface by making an extruded sealing portion to appear on its surface as much as possible even in a corner section and which can hardly make a borderline between an extruded part and a molded part to see, thereby improving the appearance. Furthermore, it is another object of this invention to provide a weather strip which can improve the durability of a sealing portion in a corner section.

It is further object of this invention to provide a weather strip which can improve an assembling ability onto an automobile body, a sealing ability and an appearance by preventing a shape recovery of a curved corner section.

At first, the following measures are taken to attain the above objects.

The first invention provides a weather strip comprising an extruded body having straight sections and a corner section curving therebetween, the extruded body comprising an attachment portion and a hollow sealing portion integrally formed by an extrusion molding, the attachment portion being attached to a part of an automobile and the sealing portion being connected to the attachment portion at both ends, wherein the weather strip comprises: an incision slit made on the outer periphery of the sealing portion in the corner section; an incision edge formed on the sealing portion along the incision slit, the incision edge being spread out toward the outer periphery of the corner section with the attachment portion and sealing portion being curved along a corner shape of the part of the automobile; and a molded part formed at least in the vicinity of the incision edge on the back side of the sealing portion in the corner section.

The second invention provides a weather strip comprising an extruded body having straight sections and a corner section curving therebetween, the extruded body comprising an attachment portion and a hollow sealing portion integrally formed by an extrusion molding, the attachment portion being attached to a part of an automobile and the sealing portion being connected to the attachment portion at both ends, wherein the weather strip comprises: a cutout long hole made by cutting out at least a part of the sealing portion which is on the outer periphery of the corner section and not seen from the front side; a cutout edge formed on the sealing portion along the cutout long hole, the attachment portion and sealing portion being curved along a corner shape of the part of the automobile; and a molded part formed at least in the vicinity of the cutout edge on the back side of the sealing portion in the corner section and in a place which projects from the cutout edge toward the outer periphery of the corner section.

The third invention provides a weather strip comprising an extruded body having straight sections and a corner section curving therebetween, the extruded body comprising an attachment portion and a lip-shaped sealing portion integrally formed by an extrusion molding, the attachment portion being attached to a part of an automobile and the sealing portion being connected to the attachment portion at one end with the other end thereof being free, wherein the weather strip comprises: a free edge formed by locating the other end of the sealing portion on the outer periphery of the corner section; at least one cut made in the sealing portion from the free edge toward the inner periphery of the corner section, the free edge being spread out toward the outer periphery of the corner section with the attachment portion and sealing portion being curved along a corner shape of the part of the automobile; and a molded part formed at least in the vicinity of the fee edge on the back side of the sealing portion in the corner section and inside the cut which is expanded by the curved transformation of the sealing portion.

A weather strip according to each of the above described inventions can provide an uniform luster on its surface by making an extruded sealing portion to appear on its surface as much as possible even in a corner section. The weather strip can hardly make a borderline between an extruded part and a molded part to see, thereby improving the appearance. Furthermore, the durability of a sealing portion in a corner section can also be improved.

The incision slit or cutout long hole may be provided within the range of the corner section, or it may reach the straight sections over the corner section.

It is preferable that at least one cut is made in the sealing portion from the incision edge or cutout edge toward the inner periphery of the corner section, and that the molded part is further formed inside the cut which is expanded by the curved transformation of the sealing portion.

The cut may be made in the sealing portion in the vicinity of each boundary between the corner section and the straight sections, or it may be made in the sealing portion in the middle of the corner section.

It is preferable that each end of the incision slit or cutout long hole undergoes a rounding finish. It is also preferable that the end of the cut undergoes a rounding finish. This is because stress concentration in each end can be improved by such a finish. For example, a round hole may be formed at an end of a cut or an incision slit. Each end of a cutout long hole may form a semicircle.

In a manner, the molded part is not formed over to project from the spread incision edge or free edge toward the outer periphery of the corner section. In another manner, the molded part is further formed in a place which projects from the spread incision edge or free edge toward the outer periphery of the corner section.

The former manner is suitably employed when spreading out the incision edge or free edge is sufficient to expand the sealing area of the corner section toward its outer periphery, and it has the advantage of being able to hardly show the molded part. The latter manner is suitably employed when spreading out the incision edge or free edge is insufficient to expand the sealing area of the corner section toward its outer periphery. Although a little of the molded part projecting from the incision edge or free edge can be seen from outside according to the latter manner, the majority which can be seen from outside besides the slight molded part is the extruded sealing portion, so that the appearance of the resulting weather strip is hardly impaired. Likewise, although a little of the molded part projecting from the cutout edge can be seen from outside according to the second invention, the majority which can be seen from outside besides the slight molded part is the extruded sealing portion, so that the appearance of the resulting weather strip is hardly impaired.

Moreover, in each manner, the molded part may be formed on the entire back side of the sealing portion in the corner section, or it may be formed only in the vicinity of the incision edge, free edge or cutout edge on the back side of the sealing portion in the corner section.

It is preferable that at least one rib is integrally formed on the back side of the molded part, extending in the direction where the corner section curves along. This is because the rib reinforces the rigidity of the molded part, and serves to maintain the curved shape of the corner section.

The molded part is not limited by its molding method such as a casting, an injection molding and a transfer molding. Examples of the flowing direction of a molding material for the molded part include the following manners (a) and (b):

(a) A manner wherein the molded part is formed by injecting a molding material into a region in the vicinity of the outer surface of the attachment portion which faces the back side of the incision edge, free edge or cutout edge in the center of the corner section so as it to flow along the back side of the sealing portion from the inner periphery toward the outer periphery of the corner section; and (b) A manner wherein the molded part is formed by injecting a molding material into a region in the vicinity of the back side of the incision edge, free edge or cutout edge in the center of the corner section so as it to flow along the back side of the sealing portion from the outer periphery toward the inner periphery of the corner section.

In each of manners (a) and (b), it is possible to set the molding material to reach final positions on the outer periphery of the corner section in the vicinity of each boundary between the corner section and straight sections. It is also possible to provide a tab on the outer periphery of each final position so as to prevent the air from remaining.

Although the attachment portion and sealing portion of the extruded body are preferably formed from a rubber, a thermoplastic elastomer also may be used. The molded part may be formed from a rubber or a thermoplastic elastomer.

The forth invention provides a weather strip comprising an extruded body having straight sections and a corner section curving therebetween, the extruded body comprising an attachment portion and a sealing portion integrally formed by an extrusion molding, the attachment portion being attached to a part of an automobile, the sealing portion sealing a gap between an opening peripheral edge of the automobile and an open and closed panel, the sealing portion being cut off in a curved corner section, and a curved molded part being formed in place of the cut off part, wherein the molded part is formed from a soft thermoplastic elastomer (TPE), and a recovery preventing portion is formed on the attachment portion by an injection molding from a hard resin, the recovery preventing portion extending in the peripheral direction of the corner section.

A weather strip according to the forth invention can improve an assembling ability onto an automobile, a sealing ability and an appearance by preventing a shape recovery of a curved corner section.

It is preferable that the molded part comprises a projecting part extending toward the outer peripheral side over the outer peripheral outline of the attachment portion, and a belt-shaped bridge connecting the outer edge of the projecting part and the attachment portion. Such a construction prevents the projecting part of the molded part from turning over or swaying by the open and closed of the door panel or its aged deterioration, thereby improving the sealing ability and appearance.

Although the region on the attachment portion where the recovery preventing portion is formed is not specifically limited, it is effective in preventing recovery to form the recovery preventing portion to have a width parallel to a sidewall of the attachment portion. For instance, if the attachment portion has a U-shaped cross-section, it is possible to form the recovery preventing portion on the inner surface or outer surface (including a surface which is appeared outside by the cut off of the sealing portion) of the U shape.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

BRIEF DESCRIPTION OF THE DRAWINGS

FIG. 13 is a sectional view taken along the line XIII—XIII of FIG. 11;

FIG. 14 is a perspective view showing an opening trim of the sixth embodiment seen from the outer peripheral side of its sealing portion in which a cutout long hole is made;

DETAILED DESCRIPTION OF THE PREFERRED EMBODIMENTS

Description will now be made of opening trims embodying the invention with reference to Figs. The first to ninth embodiments are mainly employed for attaining the above-mentioned objects.

[First Embodiment]

Figure 1:
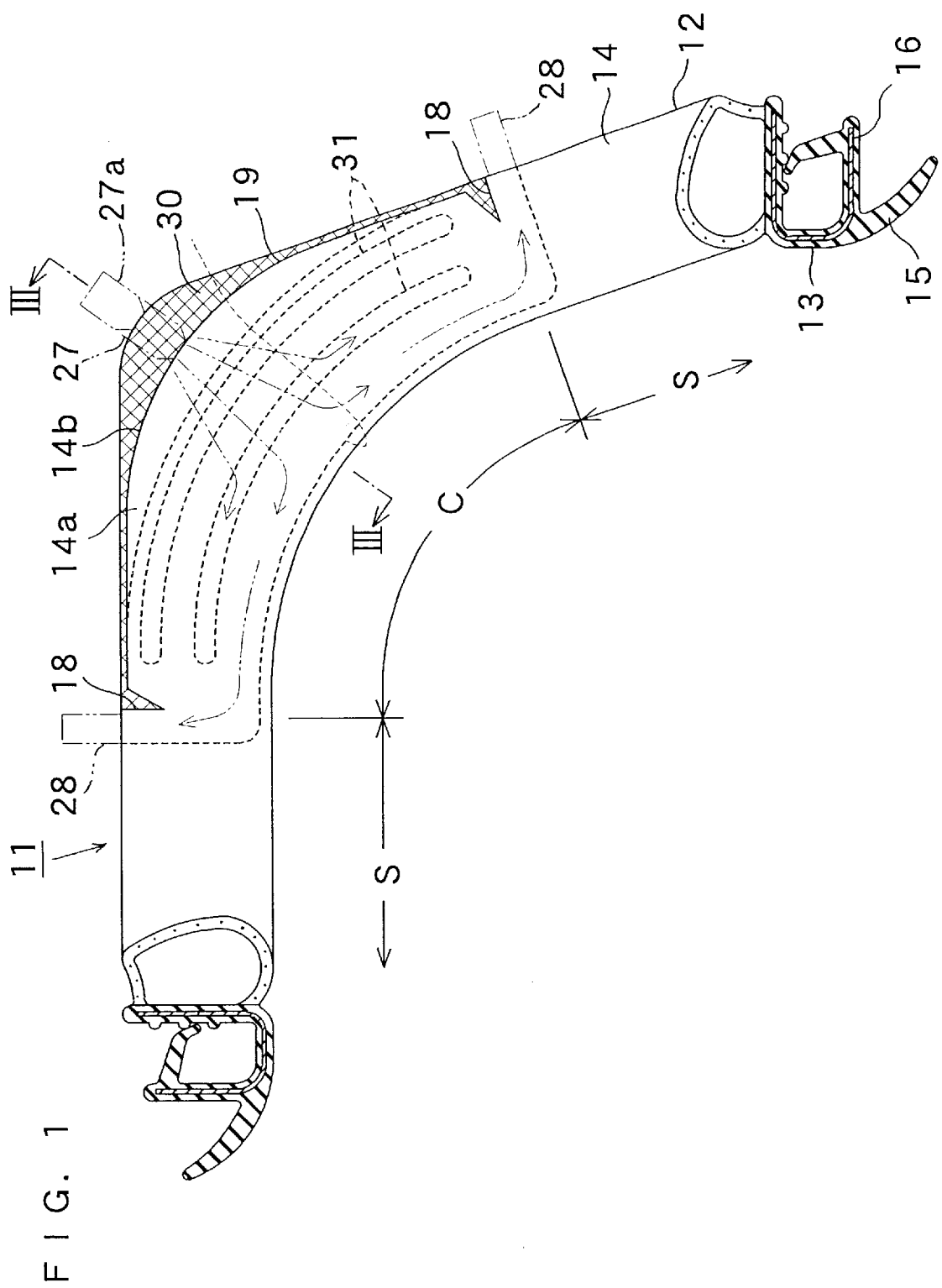
FIG. 1 is a front view showing an opening trim of the first embodiment seen from its front side (especially, the part shown by an arrow I in FIG. 23)
Figure 2:
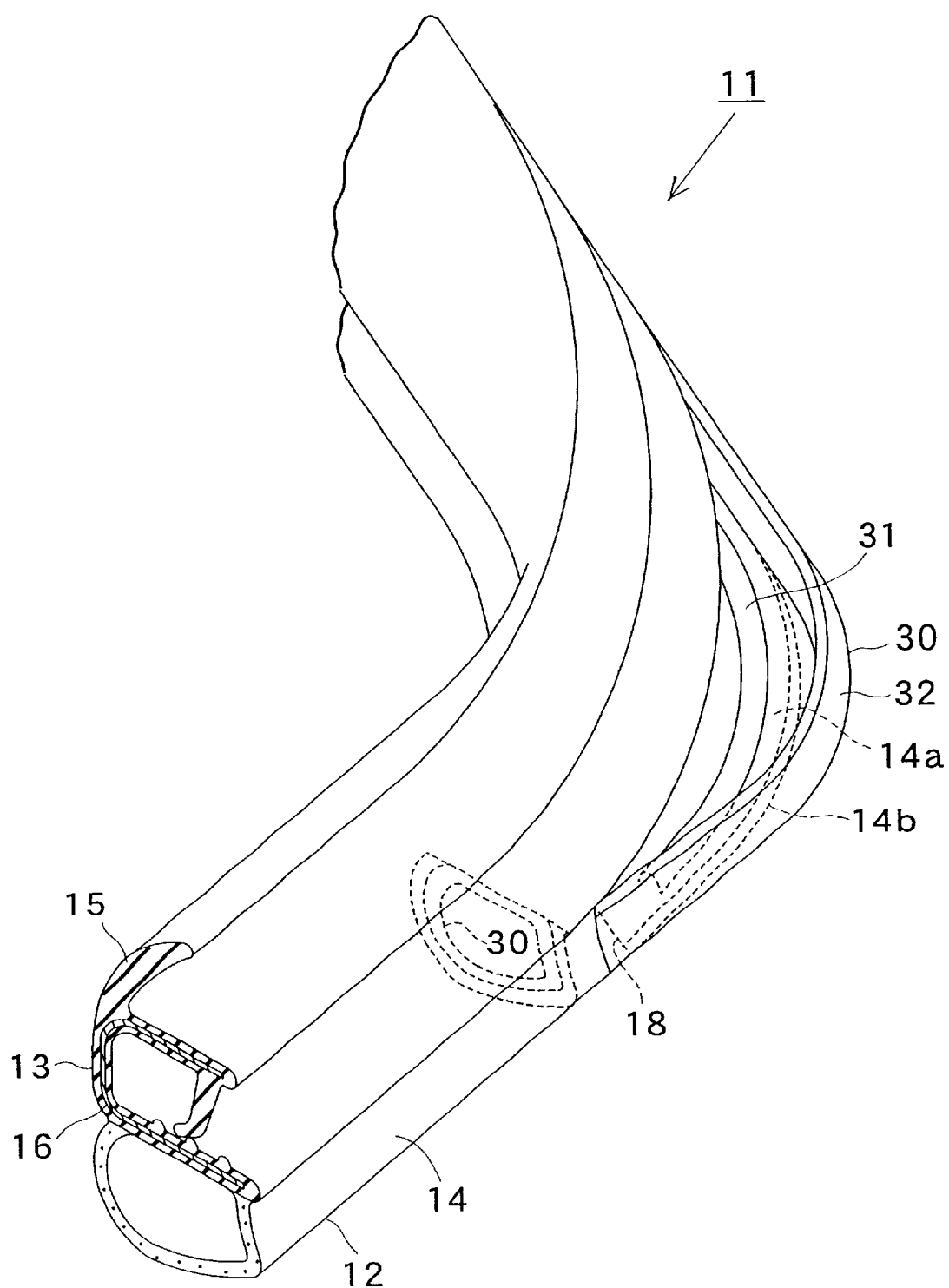
FIG. 2 is a perspective view of the same opening trim seen from its back side.
Figure 3:
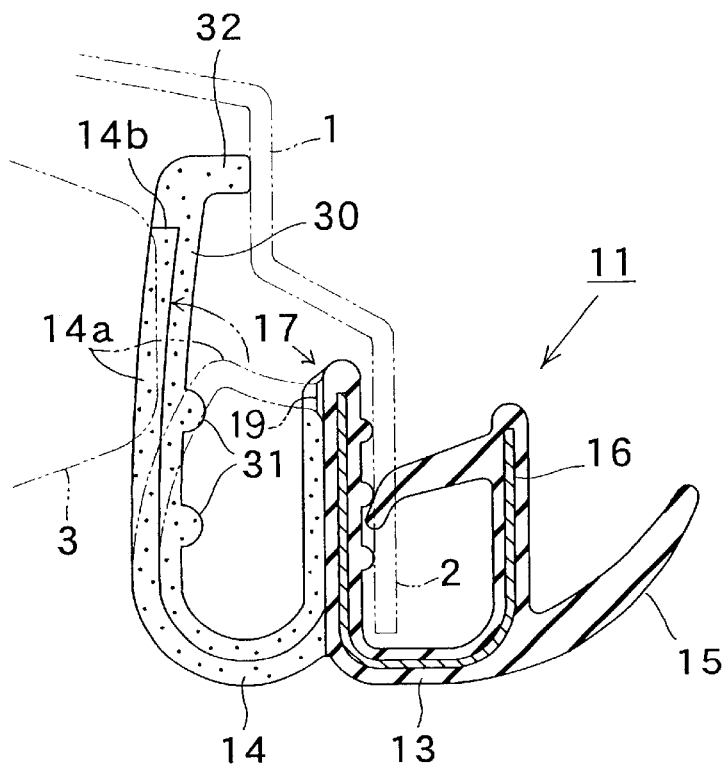
FIG. 3 is a sectional view taken along the line III—III of FIG. 1.
Figure 23:
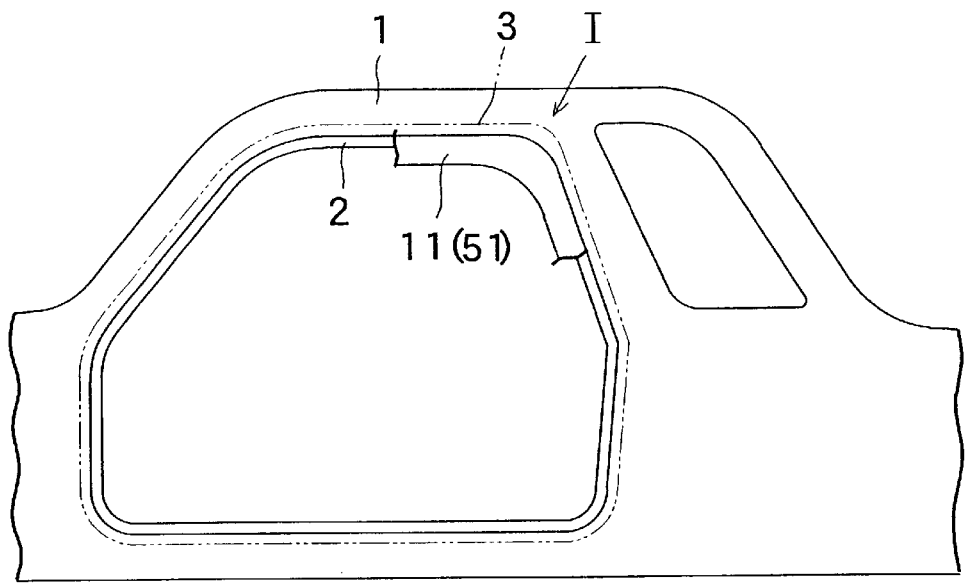
FIG. 23 is a schematic diagram of an automobile to which an opening trim is attached.
Figure 24:
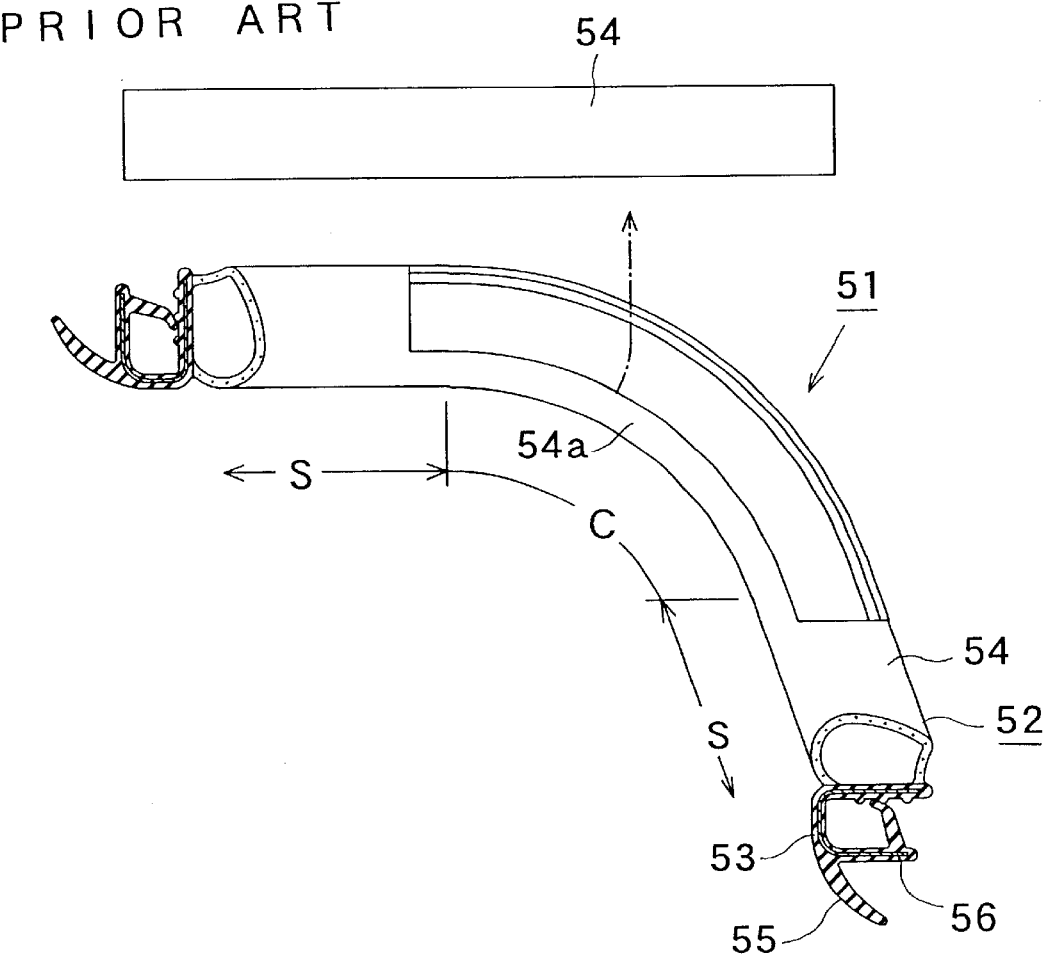
FIG. 24 is a front view of a conventional opening trim from which a sealing portion is cut off.
Figure 25:
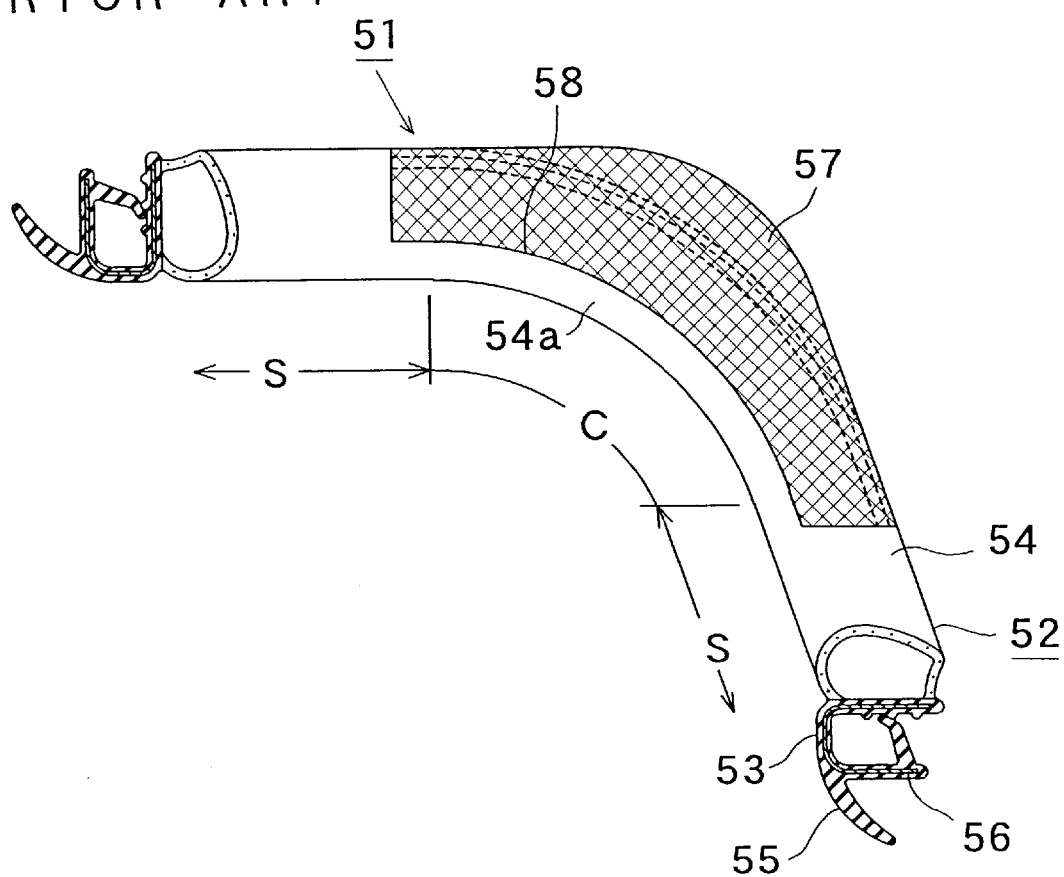
FIG. 25 is a front view of the same opening trim after a molded part is formed.

FIGS. 1 to 5 show an opening trim 11 of the first embodiment and a method for forming a corner section thereof. The opening trim 11 is mainly composed of an extruded product (body) 12. The extruded product 12 is formed by common extrusion from an EPDM (ethylene-propylene-diene copolymer) solid rubber, which forms an attachment portion (trim portion) 13 having a U-shaped cross-section and a lip portion 15 having a tongue-shaped cross-section, and an EPDM sponge rubber, which forms a hollow sealing portion 14 (concretely, it has a "C" loop-shaped cross-section). The attachment portion 13 has a metal reinforcing insert 16 embedded therein. The sealing portion 14 is connected to the attachment portion 13 at both ends of the loop. As shown in FIGS. 3 and 23, the attachment portion 13 is attached to a flange 2 of a door opening peripheral edge of an automobile body 1, the sealing portion 14 seals a gap between the body 1 and a door panel 3 when the door panel 3 is closed, and the lip portion 15 covers an edge of an interior member (not shown) such as a garnish installed in the automobile interior on the other side of the sealing portion 14 to seal a gap between the body 1 and the interior member.

Since the opening trim 11 is required to be curved along a corner of the door opening peripheral edge, it has a corner section C which curves between straight sections S, S. This curved shape of the corner section C has to be maintained. In order to expand the sealing area of the corner section C toward its outer periphery in accordance with the corner shape of the door panel 3, the sealing portion of the corner section C is required to project toward the outer periphery of the corner section C. The inner and outer peripheries of corner section C are the areas on corner section C where its radiuses are the smallest and the largest, respectively. Construction of the corner section C will be described in detail by the following forming process.

Figure 4:
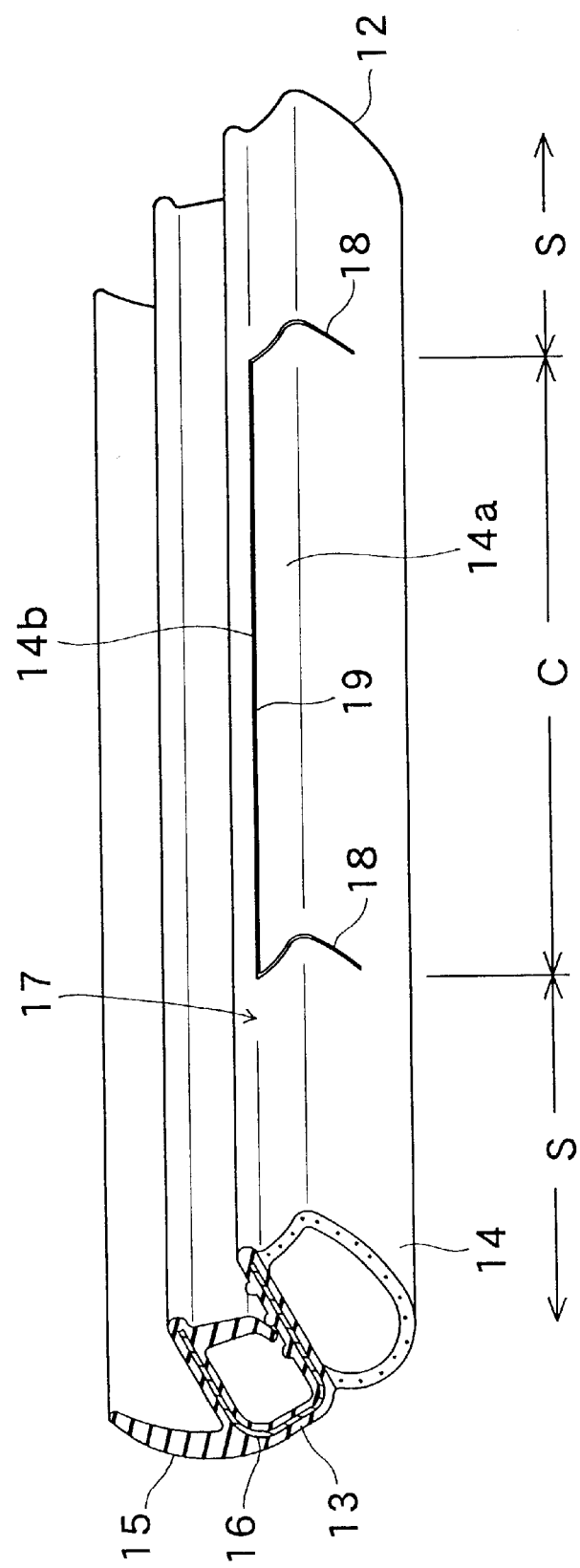
FIG. 4 is a perspective view showing the same opening trim seen from the outer peripheral side of its sealing portion in which an incision slit and cuts are made.

(1) First of all, the sealing portion 14 is cut to make a linear incision slit 19 provided on a loop edge 17 on the outer periphery of the corner section C to thereby form an incision edge 14b on the outer periphery of the sealing portion 14, as shown in FIGS. 3 (see double dashed lines) and 4. Furthermore, as shown in FIGS. 1, 2 and 4, cuts 18, 18 are made in the sealing portion 14, which run from the incision edge 14b toward the inner periphery of the corner section C in the vicinity of both ends of the incision slit 19 (in the vicinity of each boundary between the corner section C and the straight sections S, S) to thereby form a ⊓-shaped incision fin 14a.

Figure 5:
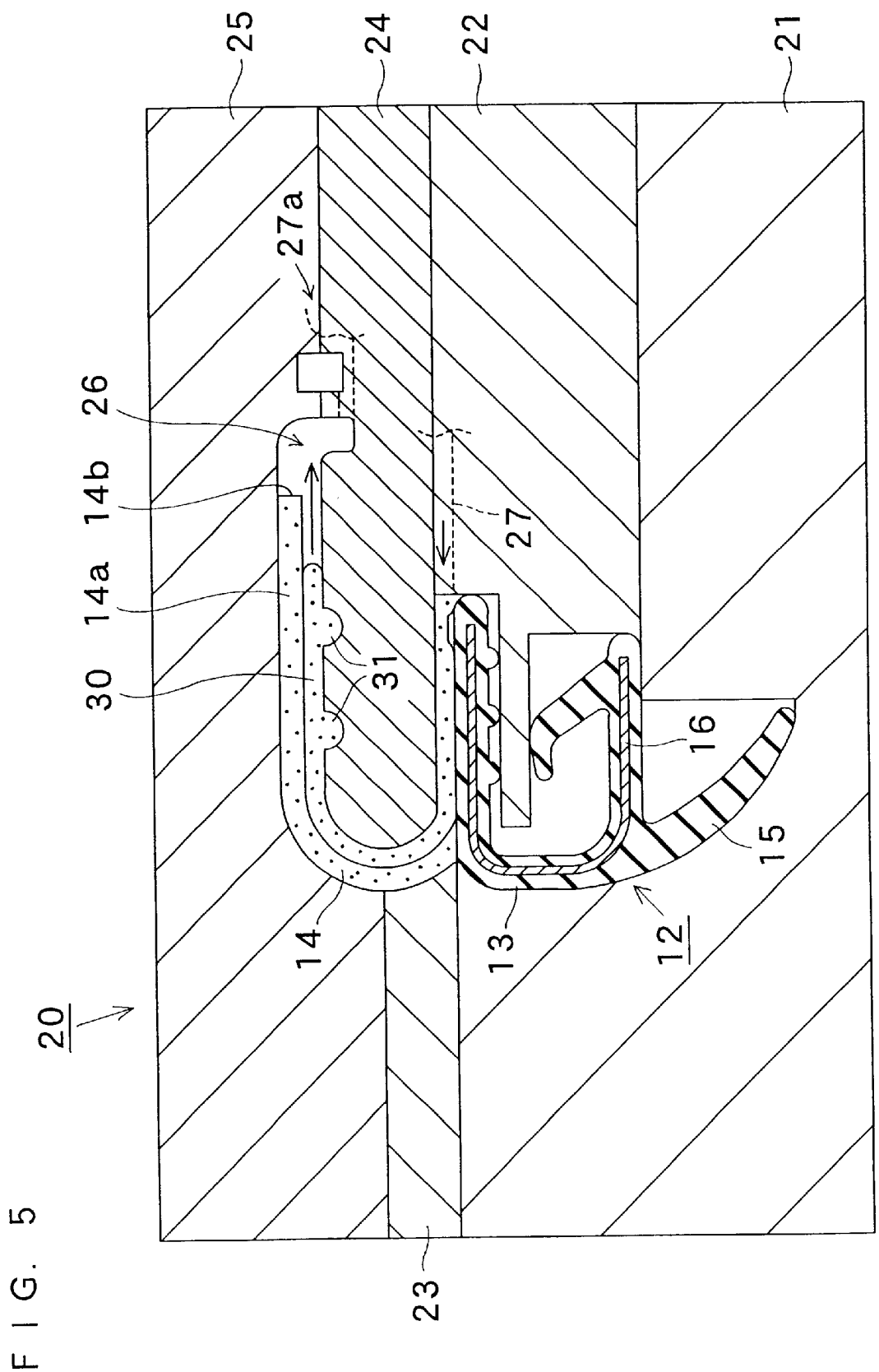
FIG. 5 is a sectional view showing a molding method for the same opening trim.

(2) With the attachment portion 13 and the incision fin 14a being curved as shown in FIGS. 1 and 2, and with the incision edge 14b being spread out to project toward the outer periphery of the corner section C as shown by an arrow in FIG. 3, the extruded product 12 is set in a mold 20 as shown in FIG. 5. The mold 20 comprises a lower mold portion 21, a first middle mold portion 22 which enters the attachment portion 13 to support it, a second middle mold portion 23 which supports the outer surface of the incision fin 14a, a third middle mold portion 24 which enters the incision fin 14a, and an upper mold portion 25. A cavity 26 is formed between the thus-set incision fin 14a and third middle mold portion 24.

(3) An EPDM sponge rubber material is injected through a gate 27 (see FIG. 5) into a region in the vicinity of the outer surface of the attachment portion 13 which faces the back side of the incision edge 14b of the incision fin 14a. Flowing along the back side of the incision fin 14a from the inner periphery of the corner section C toward the outer periphery thereof, the material is foamed and fills the cavity 26. As a result, a molded part 30 for maintaining the curved shape of the corner section C is formed along the outer surface of the attachment portion 13 and the entire back side of the incision fin 14a, and inside the cuts 18, 18 which are expanded by the above described curved transformation of the opening trim 11. In FIG. 1, cross-hatching lines are shown only to make the range of the molded part 30 clear (it is the same in FIGS. 9, 11, 15, 16, 19 and 21 where other embodiments are shown). Though the thickness of the molded part 30 is not specifically limited, 0.5 to 3 mm is preferable, and 1 to 2 mm is more preferable. As for this embodiment, the thickness is 1.2 mm on the average though it depends on the position.

In this embodiment, the molded part 30 is not only formed on the entire back side of the incision fin 14a, but also formed to project from the spread incision edge 14b toward the outer periphery of the corner section C. Accordingly, this embodiment is suitably employed when spreading out the incision edge 14b is insufficient to expand the sealing area of the corner section C toward its outer periphery in accordance with the corner shape of the door panel 3. A flange projection 32 is formed on the outer most portion of the molded part 30.

Moreover, two ribs 31 are integrally provided on the molded part 30 formed on the back side of the incision fin 14a, and extend in the direction where the corner section C curves along. The ribs 31 reinforce the rigidity of the molded part 30, and serves to maintain the curved shape of the corner section C.

Unlike the conventional weather strip (opening trim) wherein the majority of the sealing portion in the corner section is cut off, according to the opening trim 11 of the present embodiment as described above, the sealing portion 14 is remaining as the ⊓-shaped incision fin 14a, and the incision edge 14b is spread out to project toward the outer periphery of the corner section C. As a result, the extruded sealing portion 14 (including the incision fin 14a) is shown (appears on the surface) as much as possible. To the contrary, the molded part 30 appears on the surface as less as possible except that it is slightly seen inside the cuts 18, 18 and seen in a place which projects from the spread incision edge 14b. Therefore, the opening trim 11 of the present embodiment can provide an uniform luster on its surface. The weather strip can hardly make a borderline between the extruded sealing portion 14 (including incision fin 14a) and the molded part 30 to see, thereby remarkably improving the appearance.

Moreover, since the majority of the extruded sealing portion 14 having a good durability appears on the surface of the opening trim 11, the durability in the corner section C can also be improved. When a vent hole (not shown) is made for the sealing portion 14, it can be buried from the back side of the incision fin 14a.

It is possible to set the molding material injected from the above-mentioned gate 27 (see FIG. 5) to flow along the back side of the incision fin 14a in the direction as shown by double dashed lines in FIG. 1 and to reach final positions on the outer periphery of the corner section C in the vicinity of each boundary between the corner section C and the straight sections S, S. It is also possible to provide a tab 28 on the outer periphery of each final position so as to prevent the air from remaining. After the opening trim is molded, the tabs 28 and a gate burr are cut off.

[Second Embodiment]

Figure 6:
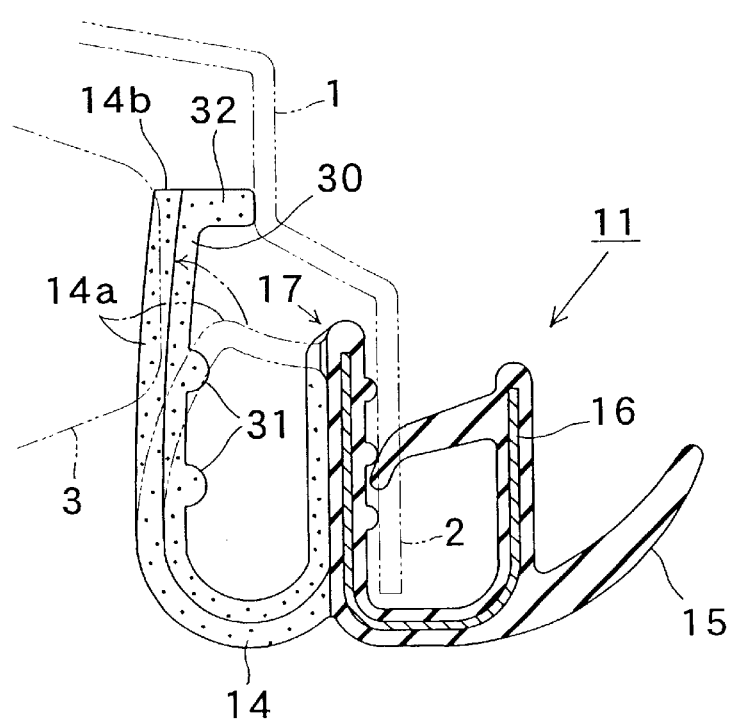
FIG. 6 is a sectional view showing an opening trim of the second embodiment.

Next, FIG. 6 shows an opening trim 11 of the second embodiment. The opening trim 11 is different from that of the first embodiment only in a point that a molded part 30 is formed within the range of the back side of the incision fin 14a so as not to project from the spread incision edge 14b toward the outer periphery of the corner section C. This embodiment is suitably employed when spreading out the incision edge 14b is sufficient to expand the sealing area of the corner section C toward its outer periphery in accordance with the corner shape of the door panel 3, and it has the advantage of being able to hardly show the molded part 30.

[Third Embodiment]

Figure 7:
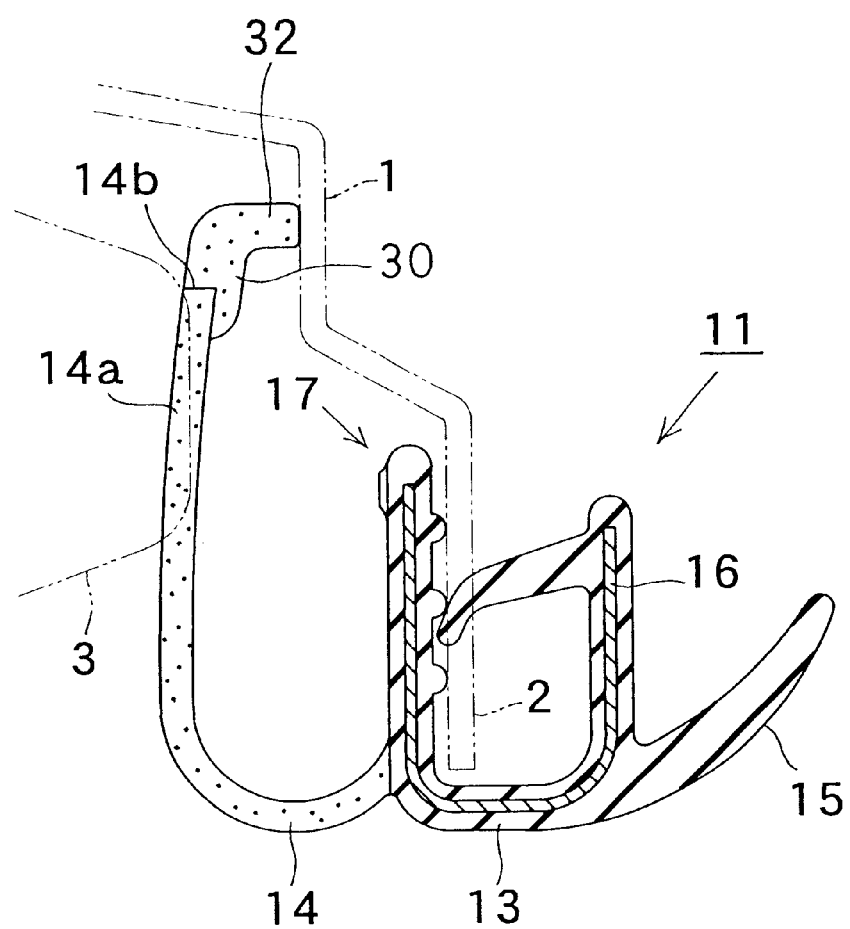
FIG. 7 is a sectional view showing an opening trim of the third embodiment.

Next, FIG. 7 shows an opening trim 11 of the third embodiment. The opening trim 11 is different from that of the first embodiment in points that a molded part 30 is formed only in the vicinity of the incision edge 14b on the back side of the incision fin 14a, in a place which projects from the incision edge 14b toward the outer periphery of the corner section C, and inside the cuts 18, 18 which are expanded by the curved transformation of the opening trim 11, and that the rib 31 is omitted. To the contrary with the first embodiment, the molded part 30 of this embodiment is formed by injecting a molding material through a gate 27a shown by broken lines in FIG. 5 into a region in the vicinity of the back side of the incision edge 14b so as it to flow along the back side of the incision fin 14a from the outer periphery of the corner section C toward the inner periphery thereof. Since the change in the rigidity between the corner section C and the straight section S can be reduced compared with the case where the molded part 30 is formed on the entire back side of the incision fin 14a, the load which is applied to the door panel 3 is not extremely changed according to the present embodiment.

This embodiment can be modified so as the molded part 30 not to project from the spread incision edge 14b toward the outer periphery of the corner section C.

This embodiment can also be modified by setting the molding material injected from the above-mentioned gate 27a to flow on the entire back side of the incision fin 14a in the direction as shown by double dashed lines in FIG. 1 and to reach final positions on the outer periphery of the corner section C in the vicinity of each boundary between the corner section C and the straight sections S, S. It is also possible to provide a tab 28 on the outer periphery of each final position so as to prevent the air from remaining. After the opening trim is molded, the tabs 28 and a gate burr are cut off.

[Fourth Embodiment]

Figure 8:
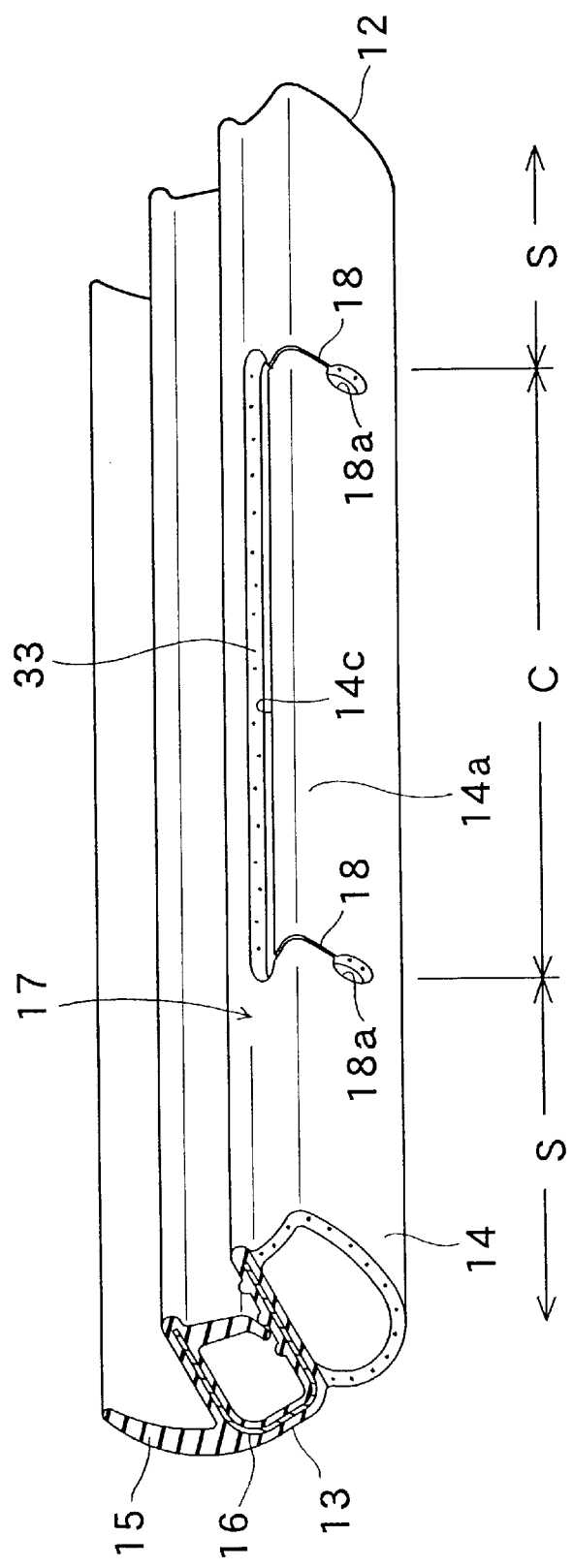
FIG. 8 is a perspective view showing an opening trim of the forth embodiment seen from the outer peripheral side of its sealing portion in which a cutout long hole and cuts are made.
Figure 9:
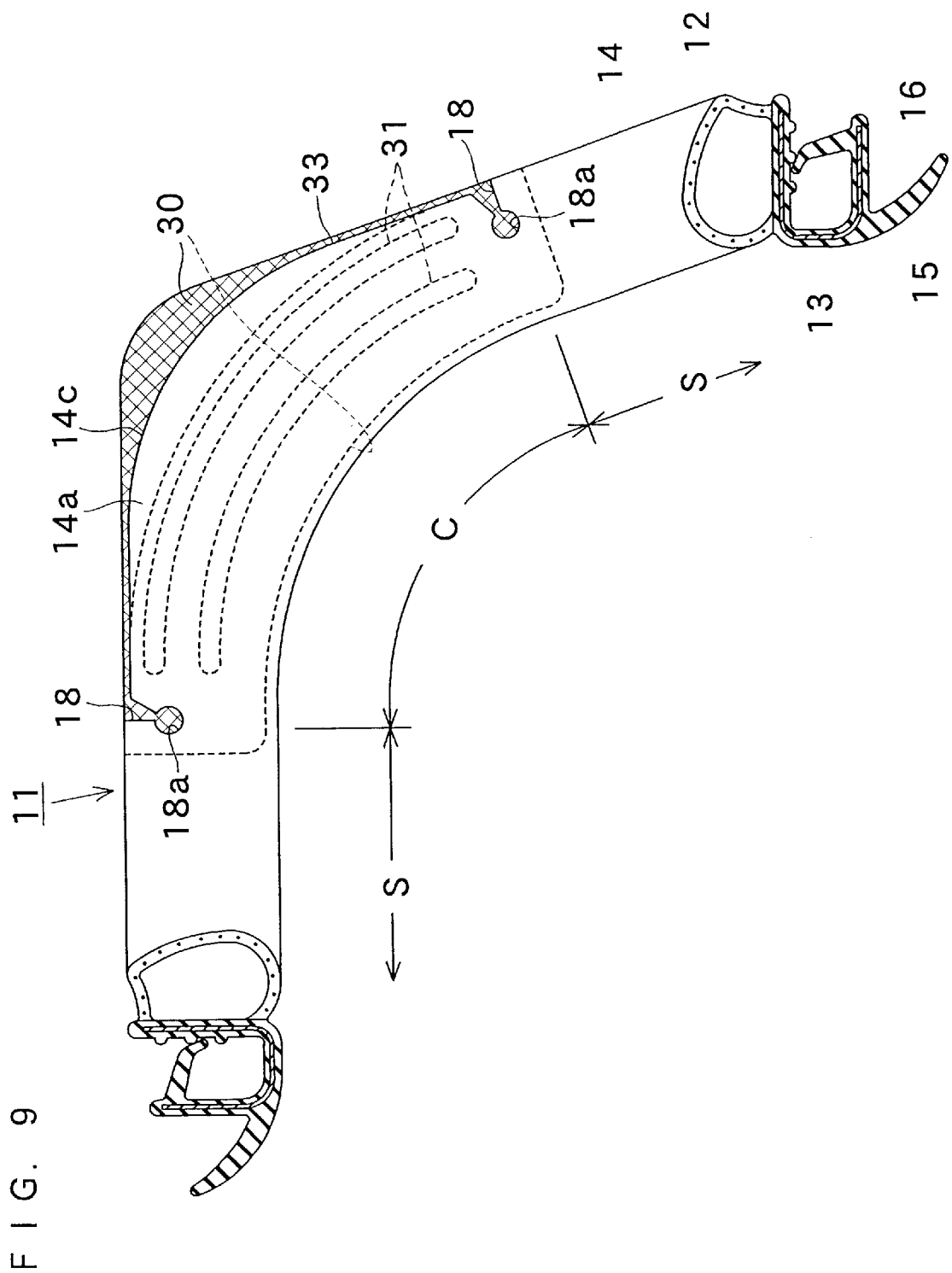
FIG. 9 is a front view showing the same opening trim.

Next, FIGS. 8 and 9 show an opening trim 11 of the forth embodiment. The opening trim 11 is different from that of the first embodiment in the following points. Namely, the incision slit 19 is replaced with a cutout long hole 33 formed by cutting out a part of the sealing portion 14 which is on the outer periphery of the corner section C and not seen from the front side (the part is shown in FIG. 8 which shows the sealing portion 14 seen from the outer side, while it is not shown in FIG. 9 which shows the sealing portion 14 seen from the front side). A cutout edge 14c of the sealing portion 14 is formed along the long hole 33, and a round hole 18a is formed at the end of each cut 18. Each end of the cutout long hole 33 forms a semicircle.

After the cutout edge 14c is formed by providing the cutout long hole 33 and the cuts 18 on the sealing portion 14 as shown in FIG. 8, the cutout edge 14c is curved as described in the first embodiment and spread out to project toward the outer periphery of the corner section C. Then, as shown in FIG. 9, a molded part 30 for maintaining the curved shape of the corner section C is formed on the outer surface of the attachment portion 13, on the back side of the incision fin 14a, in a place which projects from the cutout edge 14c toward the outer periphery of the corner section C, and inside the expanded cuts 18. Since stress concentration in ends of the cutout long hole 33 and cuts 18, which occurs when the incision fin 14a is spread out, is improved according to the present embodiment, the opening trim 11 of the present embodiment is prevented from splitting at these ends.

[Fifth Embodiment]

Next, FIGS. 10 to 13 show an opening trim 11 of the fifth embodiment. The opening trim 11 is different from that of the third embodiment in the following points. Namely, the incision slit 19 is replaced with a cutout long hole 33 formed by cutting out a part of the sealing portion 14 which is on the outer periphery of the corner section C and not seen from the front side. A cutout edge 14c of the sealing portion 14 is formed along the cutout long hole 33. A cut 18 is made only in a place at the center of the corner portion C, and a round hole 18a is formed at the end of the cut 18.

Figure 10:
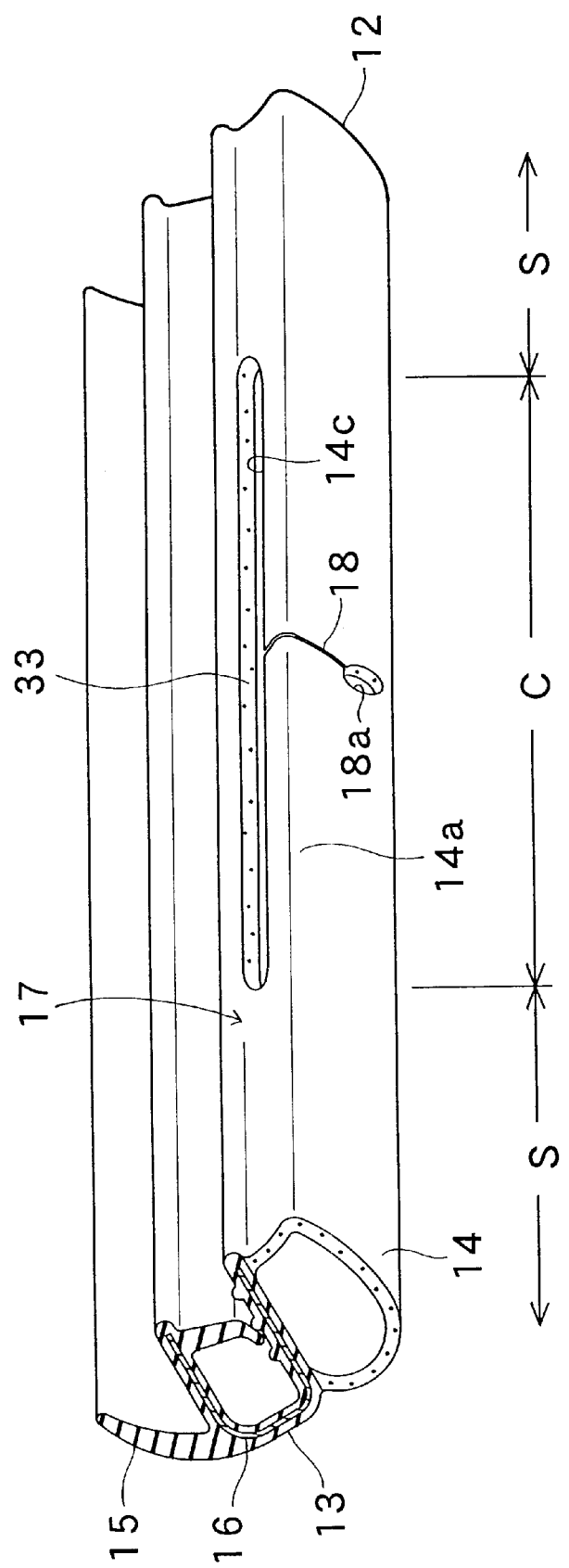
FIG. 10 is a perspective view showing an opening trim of the fifth embodiment seen from the outer peripheral side of its sealing portion in which a cutout long hole and a cut are made.
Figure 11:
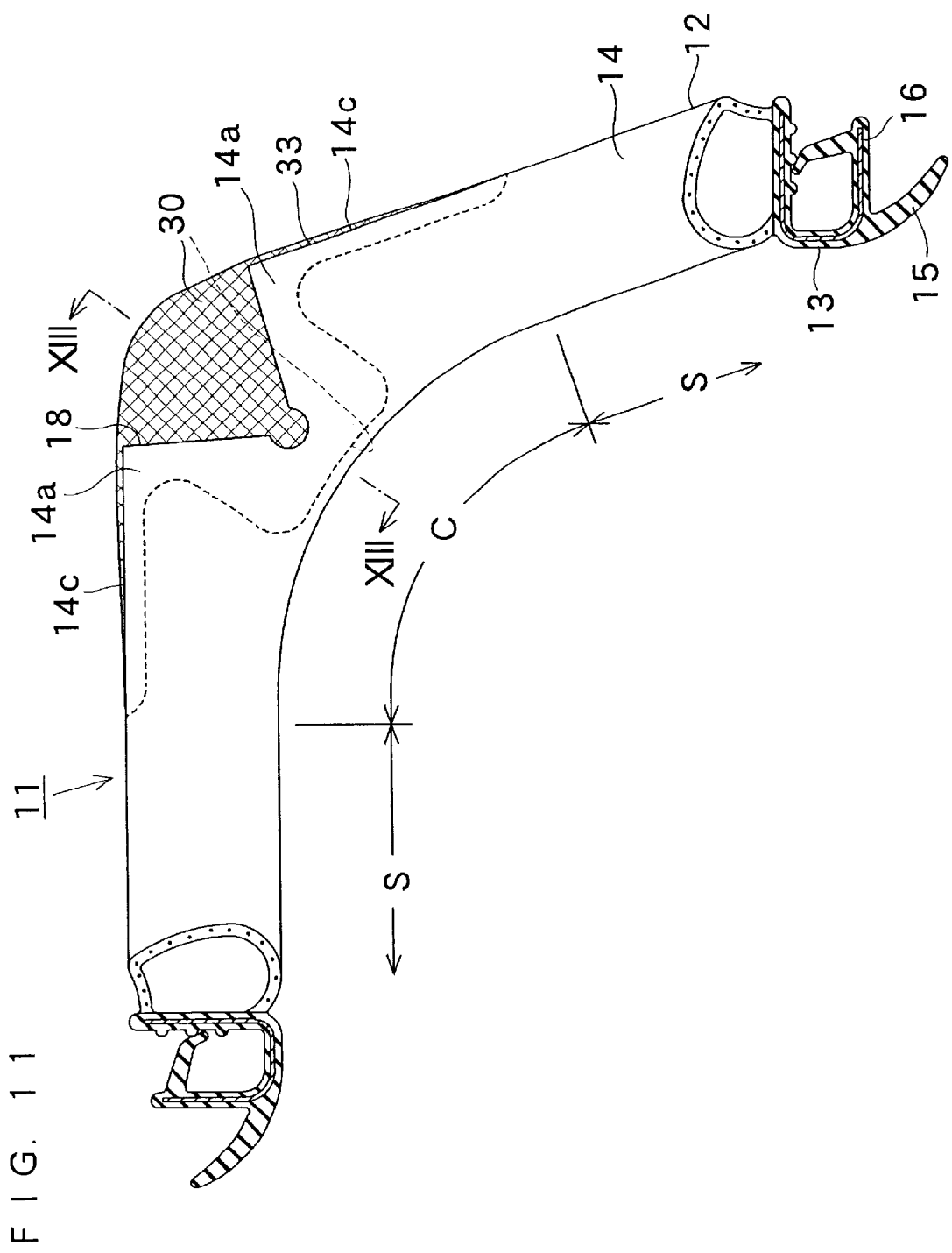
FIG. 11 is a front view showing the same opening trim.
Figure 12:
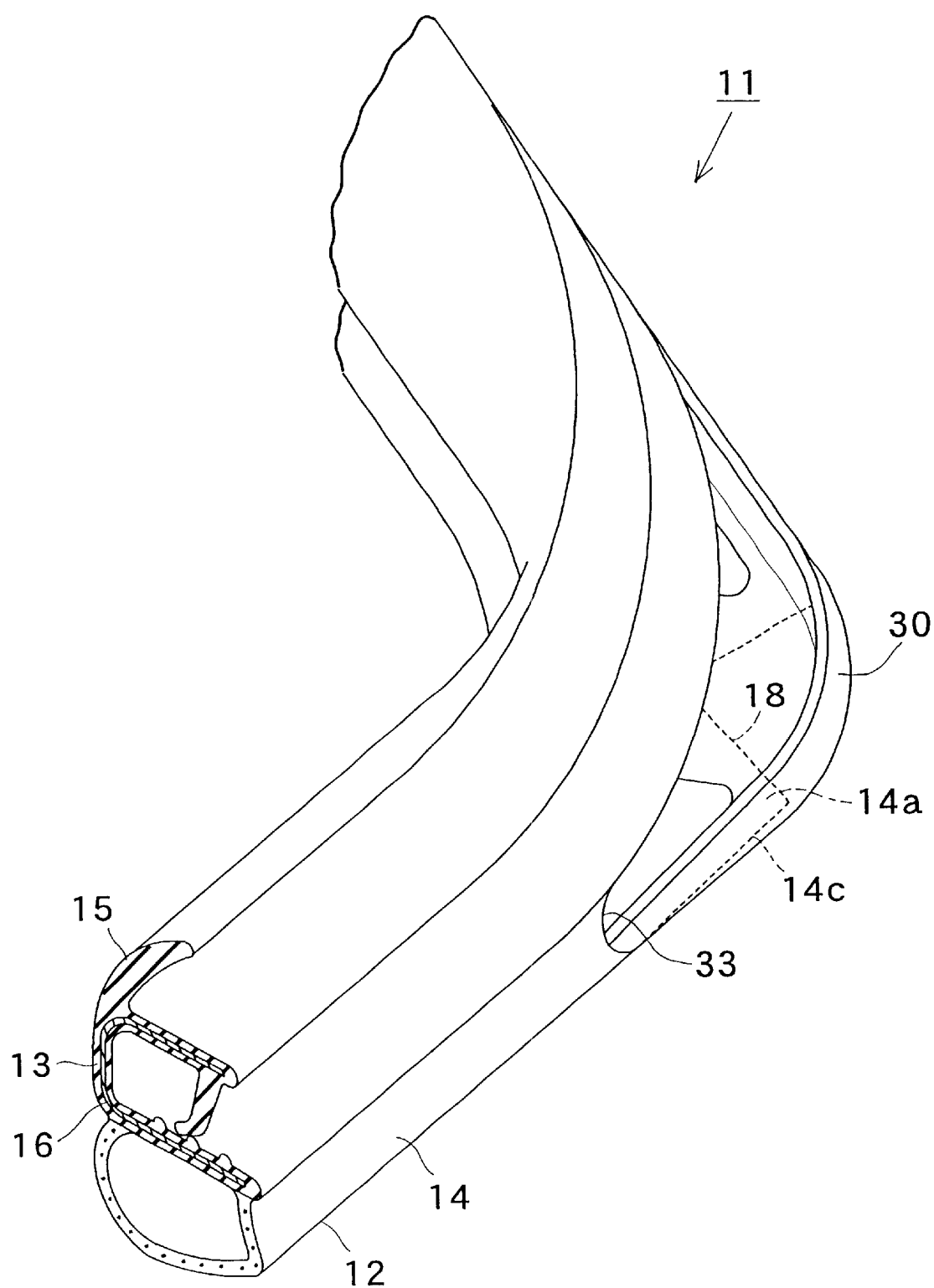
FIG. 12 is a perspective view of the same opening trim seen from its back side.

After the cutout edge 14c is formed by providing the cutout long hole 33 and the cut 18 on the sealing portion 14 as shown in FIG. 10, the cutout edge 14c is curved as described in the first embodiment and spread out to project toward the outer periphery of the corner section C. Then, as shown in FIGS. 11 to 13, a molded part 30 for maintaining the curved shape of the corner section C is formed in the vicinity of the cutout edge 14c on the back side of the incision fin 14a, and inside the expanded cut 18.

This embodiment can be modified as shown by double dashed lines in FIG. 13 so as the molded part 30 to be formed along the entire back side of the incision fin 14a and the entire outer surface of the attachment portion 13. The molded part 30 may not be formed over to project from the spread cutout edge 14c toward the outer periphery of the corner section C.

[Sixth Embodiment]

Next, FIGS. 14 to 17 show an opening trim 11 of the sixth embodiment. The opening trim 11 is different from that of the third embodiment in the following points. Namely, the incision slit 19 is replaced with a cutout long hole 33 formed by cutting out a part of the sealing portion 14 which is on the outer periphery of the corner section C and not seen from the front side. A cutout edge 14c of the sealing portion 14 is formed along the cutout long hole 33, and no cut is made. Both ends of the cutout long hole 33 of the present embodiment reach the straight sections S, S over the corner section C.

Figure 15:
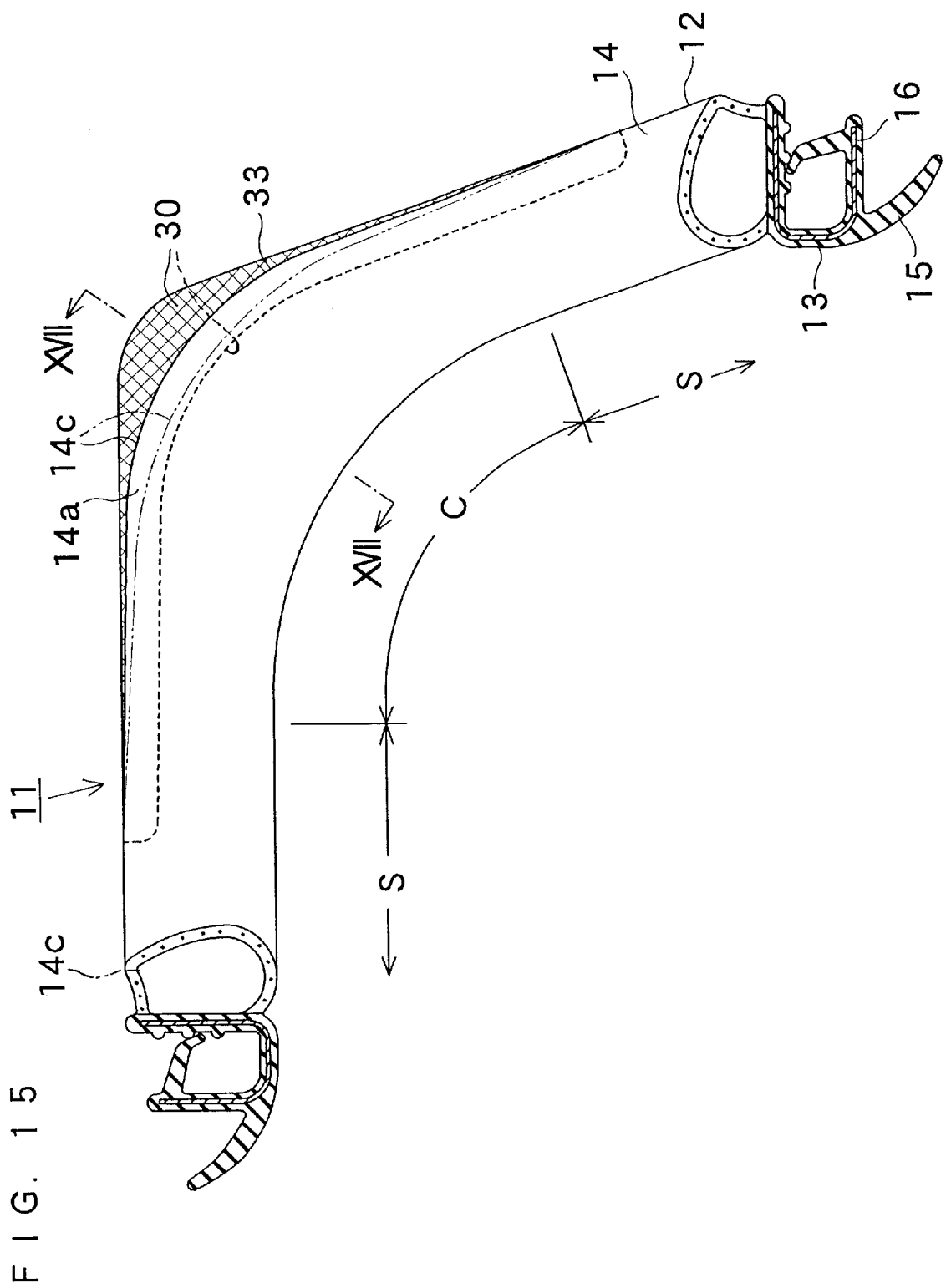
FIG. 15 is a front view showing the same opening trim from its front side.
Figure 16:
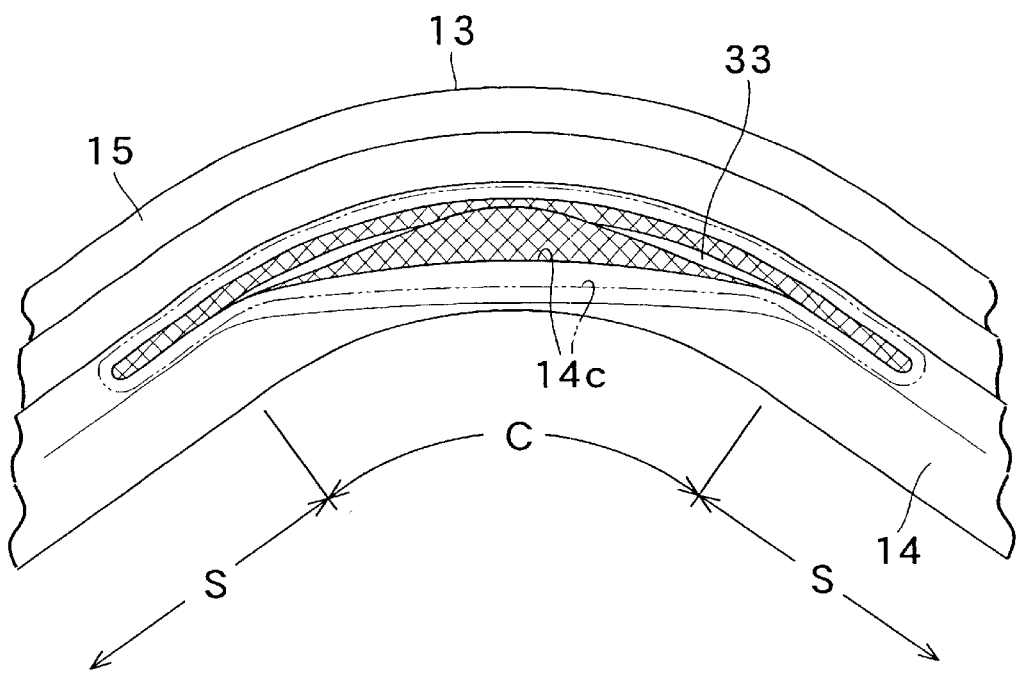
FIG. 16 is a perspective view showing the same opening trim seen from the outer peripheral side of its sealing portion.
Figure 17:
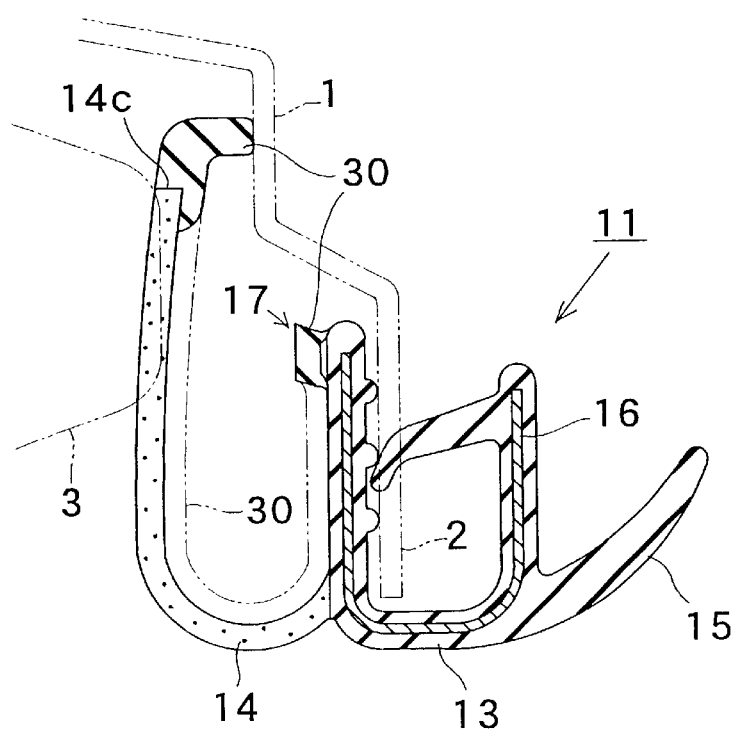
FIG. 17 is a sectional view taken along the line XVII—XVII of FIG. 15.

After the cutout edge 14c is formed by providing the cutout long hole 33 on the sealing portion 14 as shown in FIG. 14, the cutout edge 14c is curved as described in the first embodiment and spread out to project toward the outer periphery of the corner section C. Then, as shown in FIGS. 15 to 17, a molded part 30 for maintaining the curved shape of the corner section C is formed in the vicinity of the cutout edge 14c on the back side of the sealing portion 14, in both ends of the cutout long hole 33 which are expanded by the above described spread of the cutout edge 14c, and only on the outer periphery of the outer surface of the attachment portion 13. An EPDM solid rubber material is used for the molded part 30 of the present embodiment to firmly maintain the curved shape of the corner section C.

This embodiment can be modified as shown by double dashed lines in FIG. 17 so as the molded part 30 to be formed along the entire back of the sealing portion 14 and the entire outer surface of the attachment portion 13. The molded part 30 may not be formed over to project from the spread cutout edge 14c toward the outer periphery of the corner section C.

This embodiment can also be modified by enlarging the width of the cutout long hole 33 by cutting out all part of the sealing portion 14 which is on the outer periphery of the corner section C and not seen from the front side, as shown by double dashed lines in FIGS. 14–16. With this modification, an arbitrary position of the extruded product can be used as the corner section C without considering the position of a vent hole (not shown) made on the sealing portion 14 of the extruded product.

[Seventh Embodiment]

Figure 18:
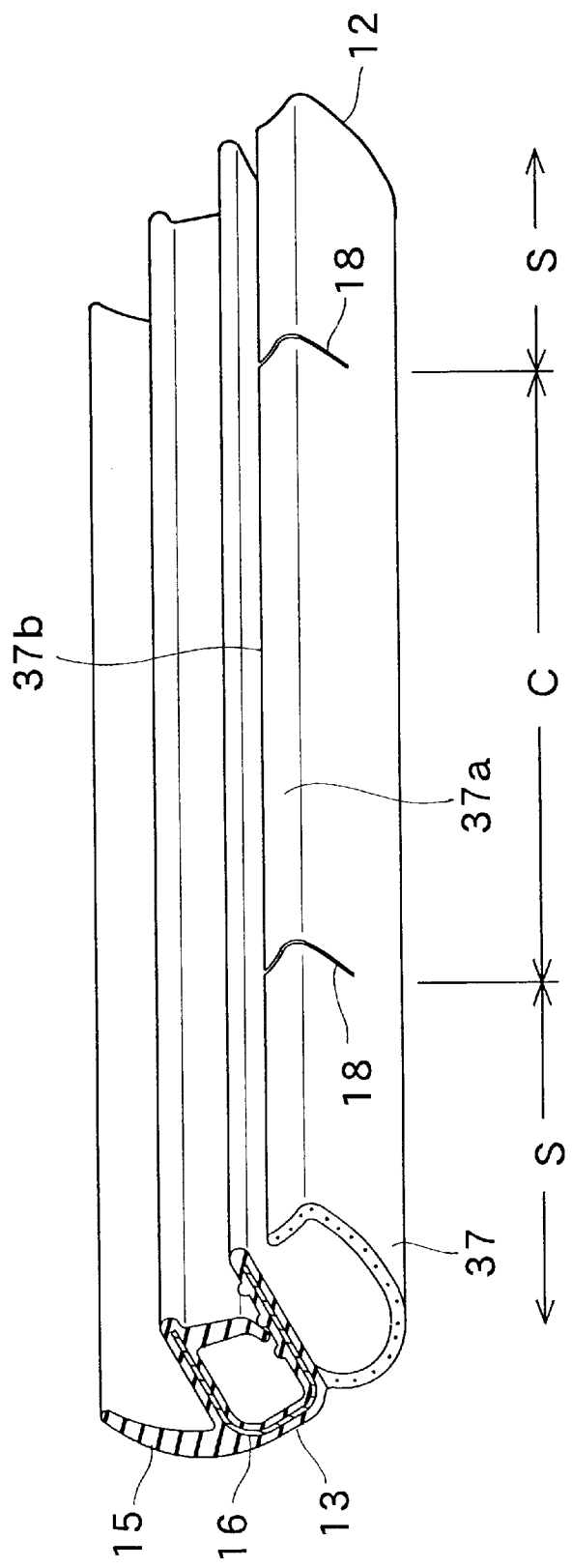
FIG. 18 is a perspective view showing an opening trim of the seventh embodiment seen from the outer peripheral side of its sealing portion in which cuts are made.
Figure 19:
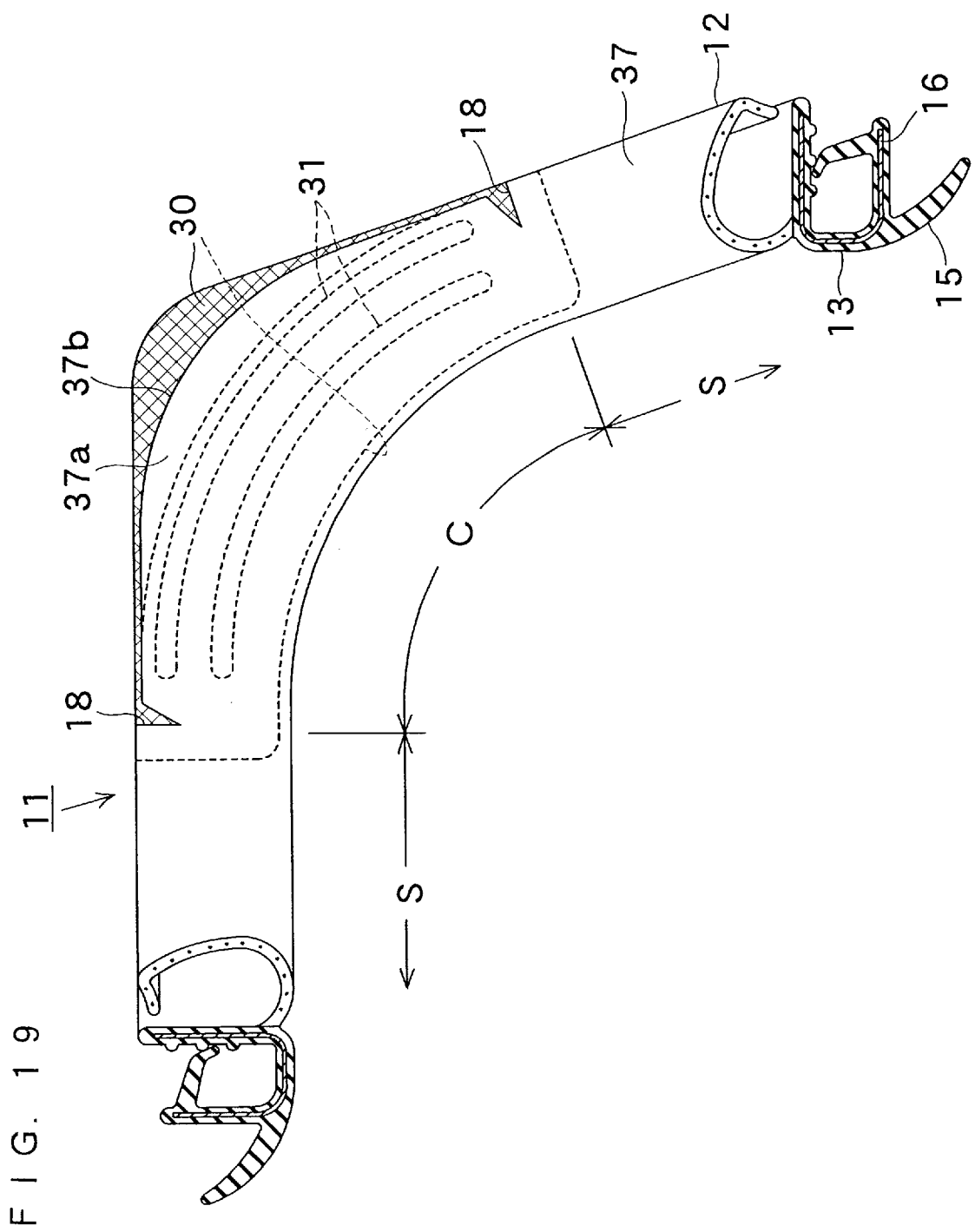
FIG. 19 is a front view showing the same opening trim from its front side.

Next, FIGS. 18 and 19 show an opening trim 11 of the seventh embodiment. The opening trim 11 is different from that of the first embodiment in a point that the hollow sealing portion 14 is replaced with a lip-shaped sealing portion 37. The sealing portion 37 is connected to the attachment portion 13 at one end with the other end thereof being free. Since the other free end (which is not connected to the attachment portion 13) of the sealing portion 37 is located on the outer periphery of the corner section C to serve as a free edge 37b, there is no need to make an incision slit.

As shown in FIG. 18, cuts 18, 18 are made in the sealing portion 37, which run from the free edge 37b toward the inner periphery of the corner section C in the vicinity of each boundary between the corner section C and the straight sections S, S to thereby form a ⊓-shaped free fin 37a. The attachment portion 13 and the sealing portion 37 are curved as described in the first embodiment, and the free edge 37b is spread out to project toward the outer periphery of the corner section C. Then, as shown in FIG. 19, a molded part 30 for maintaining the curved shape is formed along the entire outer surface of the attachment portion 13 and the entire back side of the free fin 37a, and inside the cuts 18, 18 which are expanded by the above described curved transformation of the opening trim 11.

This embodiment can be modified so as the molded part 30 to be formed only in the vicinity of the free edge 37b on the back of the sealing portion 37 or not to project from the spread free edge 37b toward the outer periphery of the corner section C.

[Eighth Embodiment]

Figure 20:
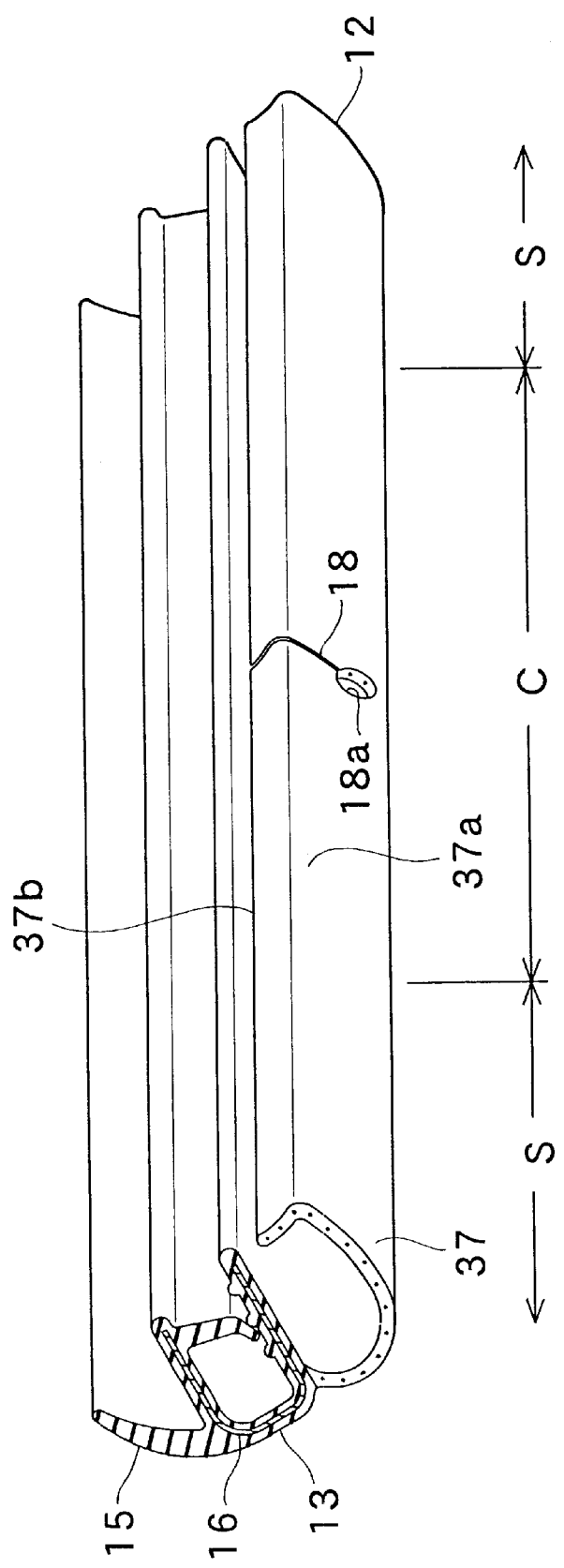
FIG. 20 is a perspective view showing an opening trim of the eighth embodiment seen from the outer peripheral side of its sealing portion in which a cut is made.
Figure 21:
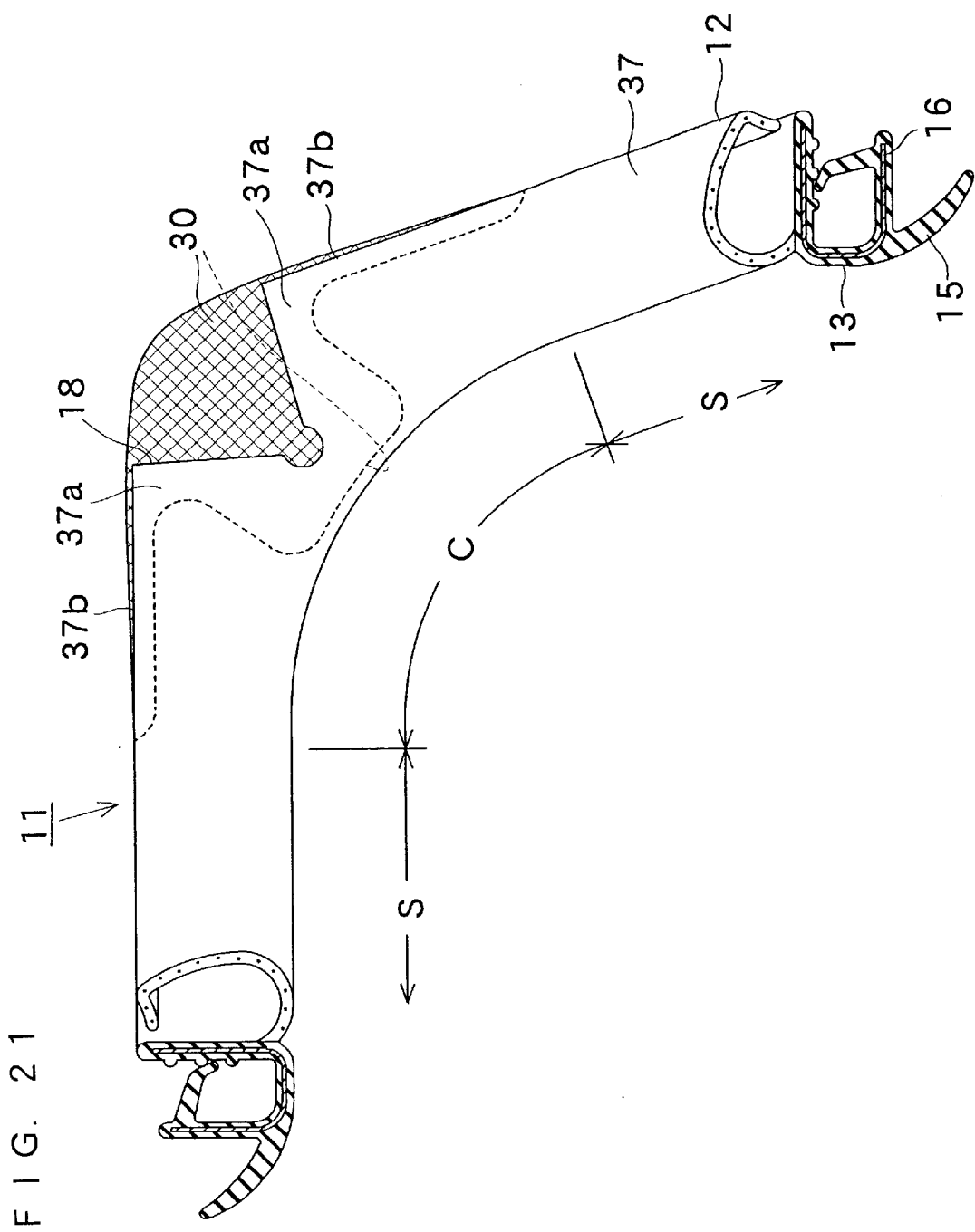
FIG. 21 is a front view showing the same opening trim from its front side.

Next, FIGS. 20 and 21 show an opening trim 11 of the eighth embodiment. The opening trim 11 is different from that of the third embodiment in the following points. Namely, the hollow sealing portion 14 is replaced with a lip-shaped sealing portion 37 which is connected to the attachment portion 13 at one end with the other end thereof being free. A cut 18 is made only in a place at the center of the corner portion C, and a round hole 18a is formed at the end of the cut 18. Since the other free end (which is not connected to the attachment portion 13) of the sealing portion 37 is located on the outer periphery of the corner section C to serve as a free edge 37b, there is no need to make an incision slit.

As shown in FIG. 20, the cut 18 is made in the sealing portion 37, which run from the free edge 37b toward the inner periphery of the corner section C in the vicinity of the center of the corner section C. The attachment portion 13 and the sealing portion 37 are curved as described in the first embodiment and the free edge 37b is spread out to project toward the outer periphery of the corner section C. Then, as shown in FIG. 21, a molded part 30 for maintaining the curved shape is formed only in the vicinity of the free edge 37b on the back side of the free fin 37a, and inside the cut 18 which is expanded by the above described curved transformation of the opening trim 11.

This embodiment can be modified so as the molded part 30 to be formed along the entire back side of the free fin 37a and the entire outer surface of the attachment portion 13. The molded part 30 may not be formed over to project from the spread free edge 37b toward the outer periphery of the corner section C.

As for such an opening trim 11 having a lip-shaped sealing portion 37 which is connected to the attachment portion 13 at one end with the other end thereof being free, as exemplified in the seventh or eighth embodiment, it is necessary to make at least one cut in the sealing portion 37. If the free edge 37b is spread out without making any cuts, which will influence the cross-section of the sealing portion 37 in the extruded straight section S, too (especially, the cross-section of the other free end which is not connected to the attachment portion 13).

On the other hand, as for such an opening trim 11 having a hollow sealing portion 14 which is connected to the attachment portion 13 at both ends, as exemplified in the sixth embodiment, it is not always necessary to make cuts in the sealing portion 14. This is because the cross-section of the sealing portion 14 in the straight section S, which is connected to the attachment portion 13 at both ends, is not influenced easily even if the cutout edge 14c (or the incision edge 14b) is spread out.

It is to be understood that the foregoing description of the structure with reference to the first to eighth embodiments is not intended for limiting the scope of this invention, but that variations or modifications may be made without departing from the scope and spirit of this invention. The following is a brief description of several examples of such modifications.

Figure 22:
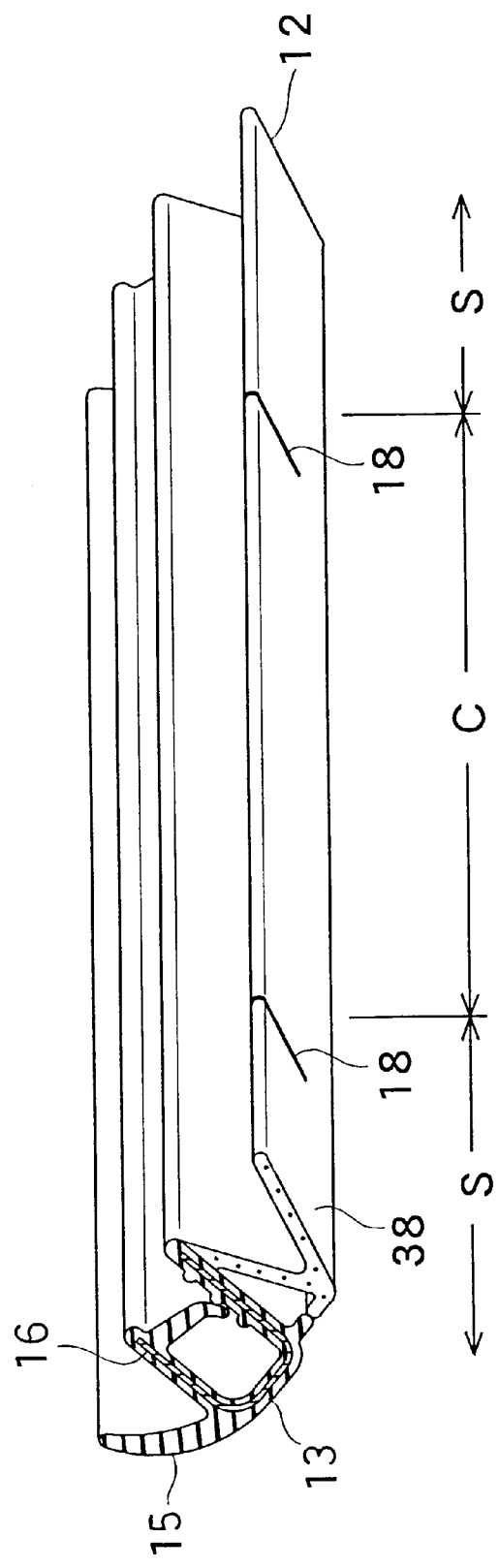
FIG. 22 is a perspective view showing another opening trim seen from the outer peripheral side of its sealing portion in which a cut is made.

(1) The depth of the cut 18 may be properly changed. It may be deeper or shallower than that shown in each Fig.
(2) The rib 31 may be properly changed in its size, shape or the number. It is also possible to increase the thickness of the molded part 30 to omit the rib 31.
(3) The flange projection 32 may be omitted.
(4) The lip portion 15 may be omitted.
(5) A rib may be provided on the outer surface of the attachment portion 13.
(6) This invention may be applied to an opening trim which is attached to an engine hood or a trunk of an automobile, or a weather strip which is attached to an open and closed panel such as a side door panel, a hatchback door panel, and a trunk panel.
(7) The attachment portion 13 and sealing portions 14, 37 may be changed in their concrete shapes depending on places where they are applied. For example, it is possible to change the sealing portion 37 of the seventh embodiment into a sealing portion 38 having a V-shaped cross-section, which is attached to the attachment portion 13 at only one end, as shown in FIG. 22.
(8) The only difference between the incision slit 19 and the cutout long hole 33 is that the latter is formed by cutting out a part of the sealing portion 14 while the former is formed without cutting out. Therefore, they are mutually substitutable. For example, the incision slit 19 of the first to third embodiment may be replaced with a cutout long hole 33 while the cutout long hole 33 of the fourth to sixth embodiment may be replaced with an incision slit 19. In a case that a cutout edge is formed by making a cutout long hole 33, the cutout edge may not be spread out.

[Ninth Embodiment]

Figure 29:
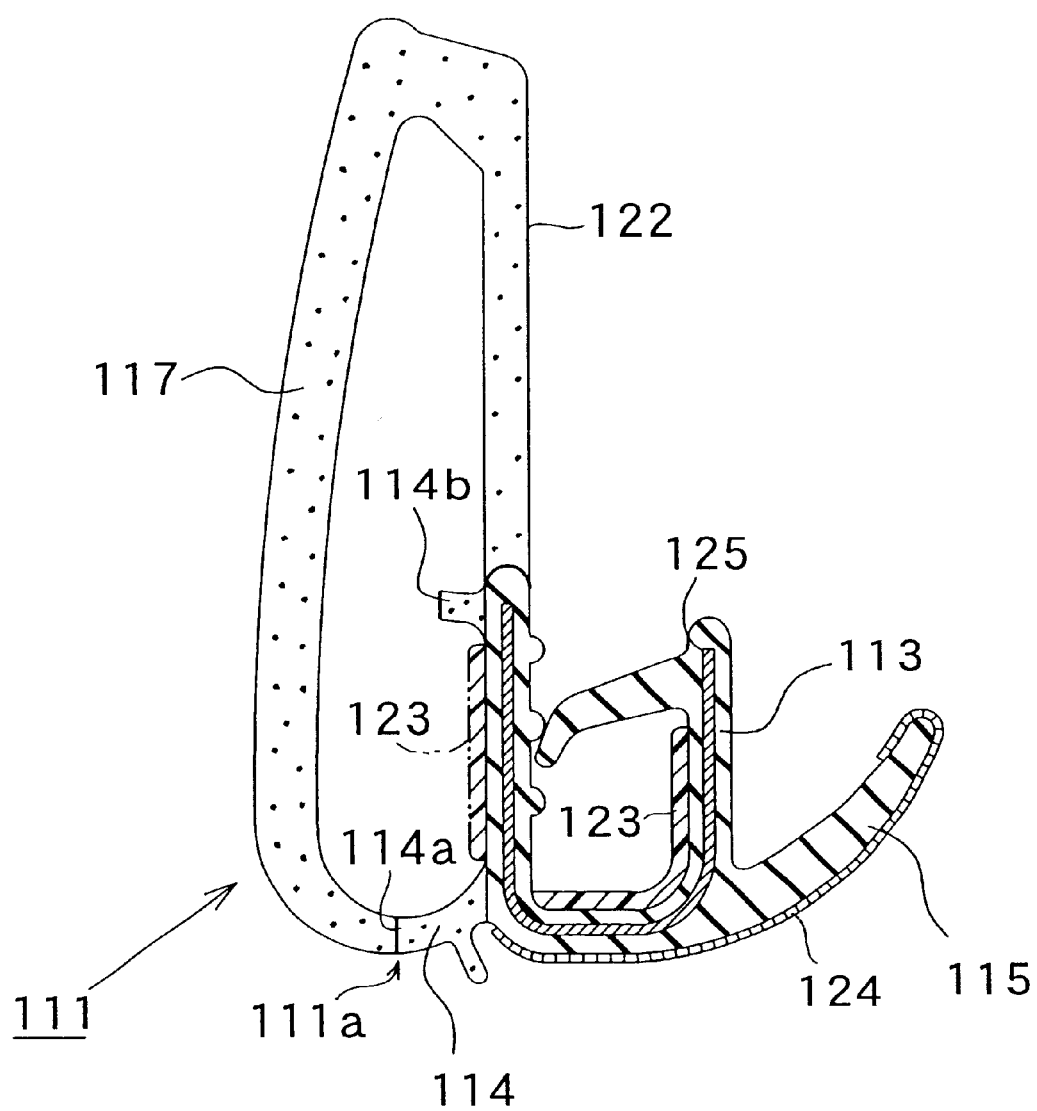
FIG. 29 is a sectional view as same as FIG. 28 showing a modified example of the same opening trim.
Figure 30:
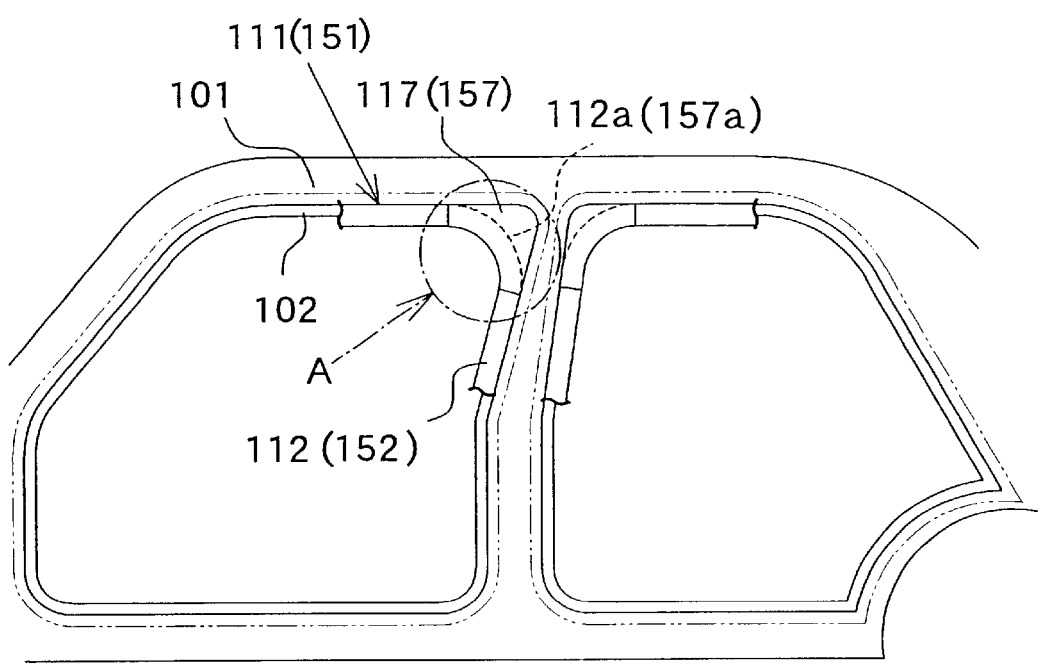
FIG. 30 is a side view of an automobile to which an opening trim is attached.
Figure 31:
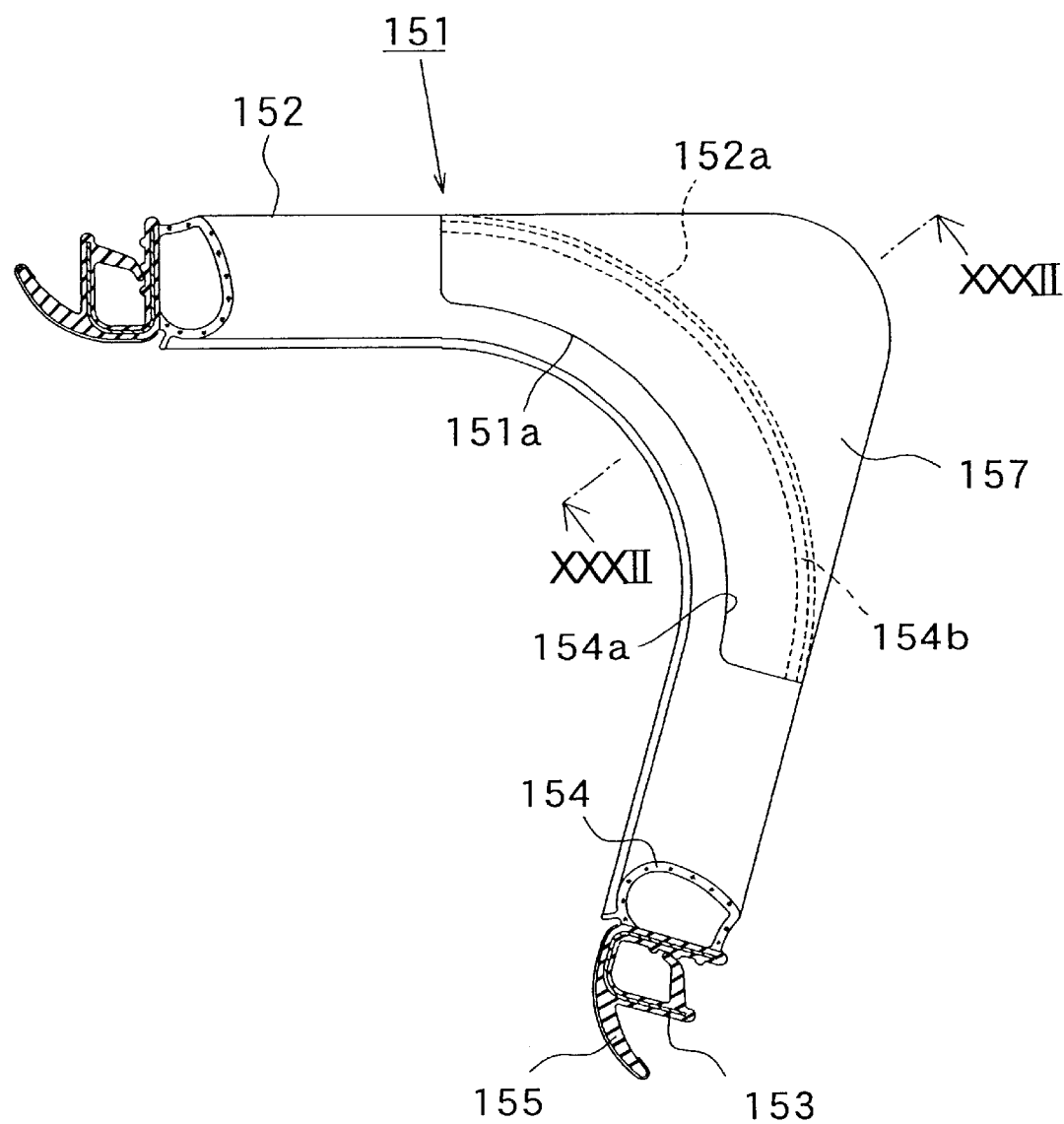
FIG. 31 is a front view of a conventional opening trim.
Figure 32:
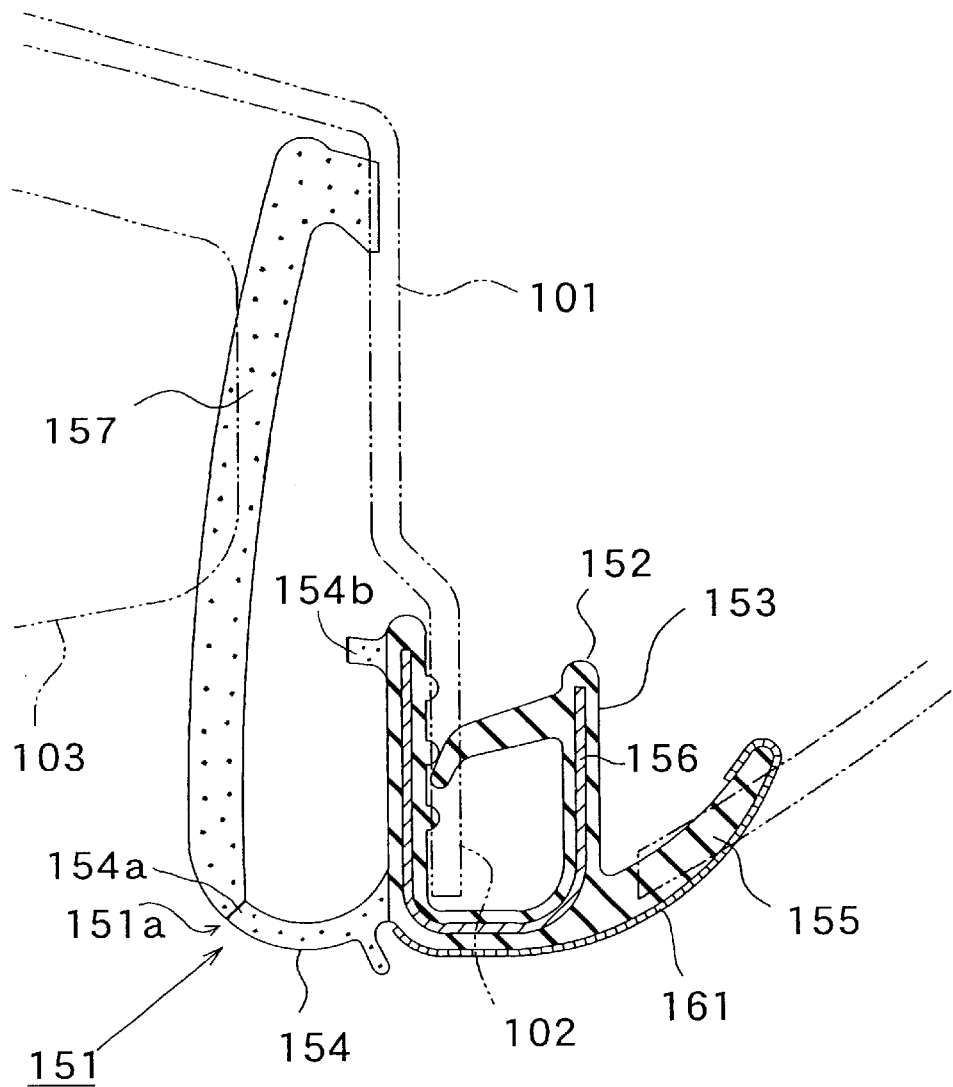
FIG. 32 is a sectional view taken along the line XXXII—XXXII of FIG. 31.
Figure 33:
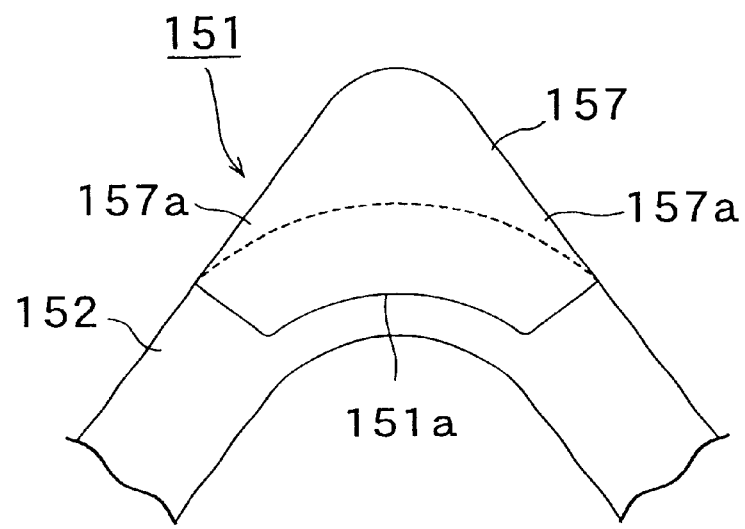
FIG. 33 is a schematic diagram showing a curved corner section of the same opening trim.
Figure 34:
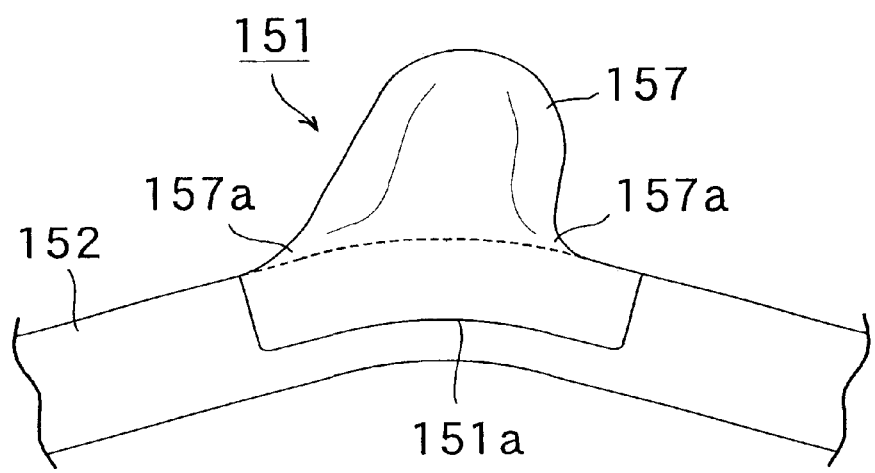
FIG. 34 is a schematic diagram showing the curved corner section which almost recovers its straight shape.

Description will now be made of an opening trim embodying the invention with reference to FIGS. 26 to 30, which is attached to a door opening peripheral edge of a front side door of an automobile body 101 and seals a gap between the body 101 and a door panel 103 when the door panel 103 is closed, as shown in FIG. 30.

Figure 26:
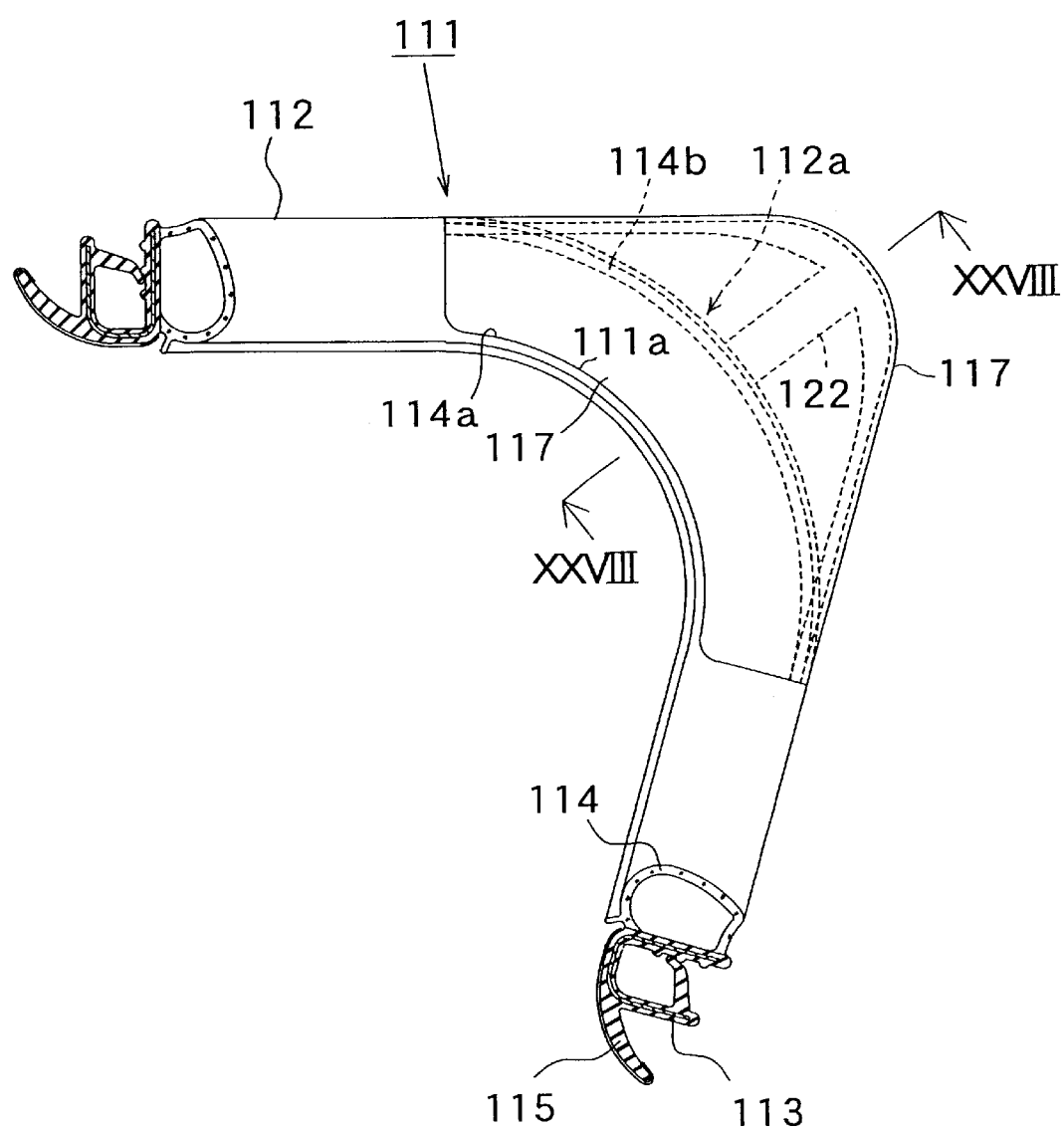
FIG. 26 is a front view of the part A in FIG. 30 showing an opening trim of the ninth embodiment.
Figure 27:
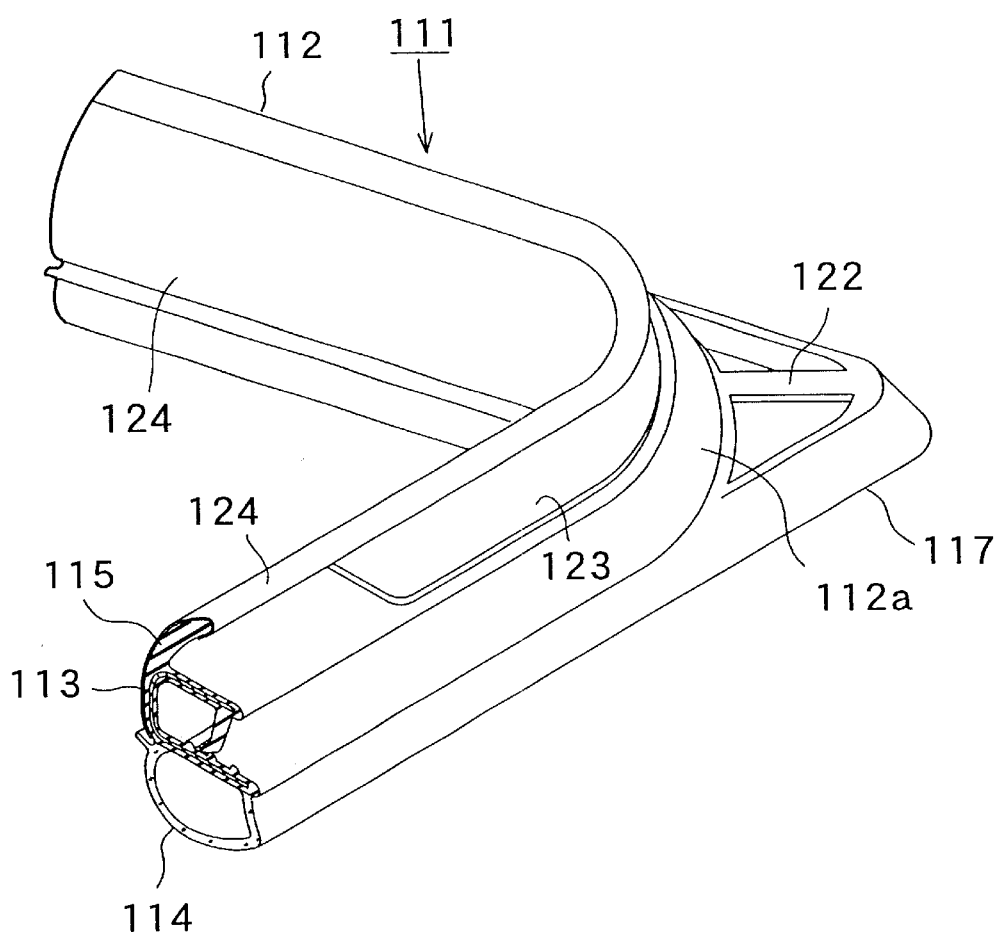
FIG. 27 is a perspective view of the same opening trim seen from its back side.
Figure 28:
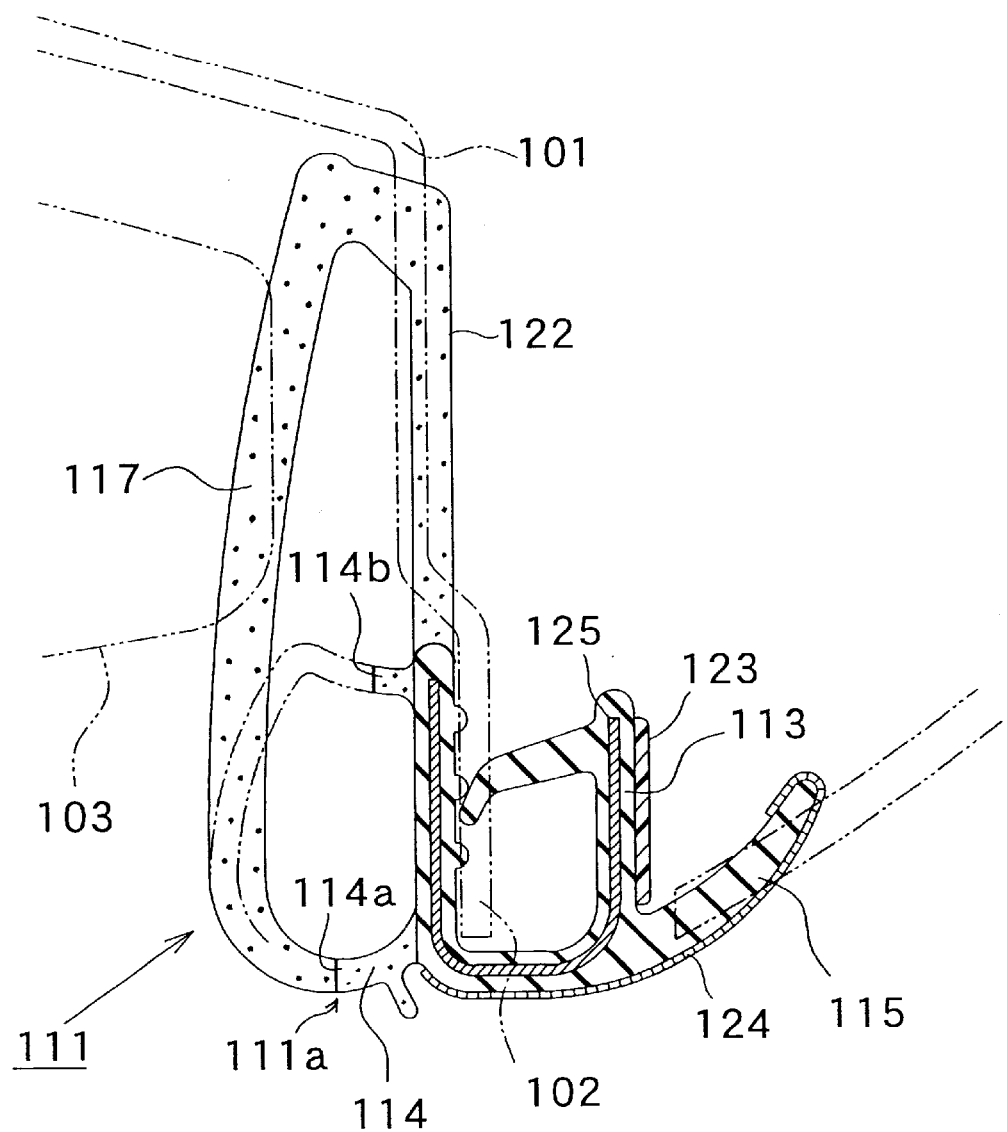
FIG. 28 is a sectional view taken along the line XXVIII—XXVIII of FIG. 26.

FIGS. 26 to 28 show an opening trim 111 of the ninth embodiment. The opening trim 111 is mainly composed of an extruded rubber product (body) 112 except for a molded part. The extruded rubber product 112 is formed by common extrusion from an EPDM solid rubber, which forms a U-shaped attachment portion (trim portion) 113 and a lip portion 115, and an EPDM sponge rubber, which forms a hollow sealing portion 114. The attachment portion 113 has a reinforcing insert 125 having a U-shaped cross-section. The attachment portion 113 has a cover layer 124 extruded from a coloring TPE for surface decoration, which extends from the boundary with the sealing portion 114 of the attachment portion 113 to the back side of the lip portion 115 via its tip edge. The attachment portion 113 is attached to a flange 102 of a door opening peripheral edge of the automobile body 101, the sealing portion 114 seals a gap between the body 101 and the door panel 103, and the lip portion 115 covers an edge of an interior member such as a garnish installed in the automobile interior on the other side of the sealing portion 114 to seal a gap between the body 101 and the interior member.

At a corner section 112a (a curved part between a horizontal straight part and a vertical straight part) which is to be curved along the door opening peripheral edge, a molded part 117 having a projecting part is provided. In order to form the molded part 117, the sealing portion 114 in the corner section 112a is first cut off in a length of about 50 to 100 mm remaining its inner and outer peripheral parts 114a and 114b. These parts 114a and 114b form inner and outer peripheries of the extruded rubber product 112 when the product 112 is curved, respectively. Then, the corner section 112a of the extruded rubber product 112 is curved and the product 112 is set in a metal mold which is not heated and composed of split molds and a core (this metal mold has a cavity for forming the molded part 117 and a cavity for forming a recovery preventing portion 123). Next, a soft TPE material is injected into the metal mold to form the curved molded part 117 which is substituted for the cut off part of the sealing portion 114 and connected to the remaining inner peripheral part 114a. Simultaneously, a belt-shaped bridge 122 is formed between the tip of the squarish outer edge of the projecting part of the molded part 117, which extends toward the outer peripheral side over the outer peripheral outline of the attachment portion 113, and the attachment portion 113. Both ends of the bridge 122 are connected to the tip and the attachment portion 113, respectively.

The cross-section of the molded part 117 in its both ends almost corresponds to that of the outer peripheral part 114b of the cut off sealing portion 114, while the cross-section of the molded part 117 on its center is squarish on the outer periphery to serve as the projecting part in accordance with the corner shape of the door opening peripheral edge. On the back side of the squarish part, both sides of the bridge 22 open apart from the attachment portion 113.

After the molded part 117 is formed, the recovery preventing portion 123 is molded from a hard resin derived from polyolefin such as a polyethylene and polypropylene by an injection molding. The recovery preventing portion 123 is formed on a surface of the attachment portion 13, which faces the back side of the lip portion 115, extending in the peripheral direction of the corner section 112a.

Although the region where the recovery preventing portion 123 is formed is not specifically limited, it is effective in preventing recovery to form the recovery preventing portion 123 to have a width parallel to a sidewall of the attachment portion 113. For instance, it is possible to form the recovery preventing portion 123 on the inner surface of the U-shaped attachment portion 113 as shown in FIG. 29. In this case, a width parallel to a sidewall of the attachment portion 113 is highly effective in preventing recovery, while a width parallel to a connecting wall which connects both sidewalls of the attachment portion 113 is not so effective. As shown by double dashed lines in FIG. 29, it is also possible to attach a separately molded recovery preventing portion 123 to an outer surface of the attachment portion 113, which is appeared outside by the cut off of the sealing portion 114.

The opening trim 111 as described above can prevent the curved corner section 112a from recovering its straight shape by the shape recovery force of the insert 156 since it has the recovery preventing portion 123. Accordingly, different from a conventional opening trim, it can be easily assembled onto an automobile body by operators without curving the corner section again with their hands.

The recovery preventing portion 123 also serves to prevent transformation of the molded part 117 due to the recovery of the straight shape of the corner section 112a, thereby improving a sealing ability and an appearance of the molded part 117.

Since a TPE material and not a rubber material, which needs heating for its, vulcanization, was used as a material for the molded part 117, a general metal mold for resins, which does not need heating, can be used. Therefore, it is possible to form the recovery preventing portion 123 from a hard resin by an injection molding almost simultaneously with the molding of the molded part 117. Accordingly, manufacturing processes are not greatly increased by the provision of the recovery preventing portion 123.

Furthermore, since a non-heated metal mold can be used to form the molded part 117, the conventional problem that the surface of the cover layer 124 melts does not occur at all. As a result, the inner peripheral part 114a of the sealing portion 114 can remain as narrow as possible, so that the boundary where the inner peripheral part 114a connects with the molded part 117 is hardly seen from outside, which improves the appearance.

Moreover, the bridge 122 supports the projecting part of the molded part 117, which prevents the projecting part from turning over or swaying by the open and closed of the door panel or its aged deterioration, thereby improving the sealing ability and appearance.

It is to be understood that the foregoing description of the structure with reference to the ninth embodiment is not intended for limiting the scope of this invention, but that variations or modifications may be made without departing from the scope and spirit of this invention. The following is a brief description of a few examples of such modifications.

(1) This invention may be applied to another corner section different from the above-embodied corner section of the opening trim.

(2) This invention may be applied to an opening trim which is attached to an engine hood or a trunk of an automobile. The attachment portion and sealing portion may be changed in their concrete shapes depending on the place where they are applied.

(3) The TPE covering as the cover layer may be changed to a cloth covering.

As many apparently widely different embodiments of this invention may be made without departing from the spirit and scope thereof, it is to be understood that the invention is not limited to the specific embodiments thereof except as defined in the appended claims.

What is claimed is:

1. A weather strip comprising an extruded body having straight sections and a corner section curving therebetween,
   said extruded body comprising an attachment portion and a hollow sealing portion,
   the attachment portion being configured for attachment to a flange,
   the hollow sealing portion comprising
   a front portion, a bottom edge of which is attached adjacent a front edge of a first surface of the attachment portion,
   a rear portion, a bottom edge of which is attached adjacent a rear edge of the first surface of the attachment portion, the orientation of the rear portion being such that it is normally hidden from view when the extruded body is attached to the flange, and
   an intermediate portion disposed between the front portion and the rear portion;
   wherein the corner section of the extruded body further comprises
   a longitudinal incision having a first end and a second end made in the rear portion of the hollow sealing portion along the corner section, and
   a first transverse incision made perpendicular to the longitudinal incision at the first end and extending toward the intermediate portion and
   a second transverse incision made perpendicular to the longitudinal incision at the second end and extending toward the intermediate portion, to thereby define an incision fin that is rotated away from the attachment portion and extends toward an outer periphery of the corner section to act as an extension of the intermediate portion of the hollow sealing portion; and
   a molded portion formed in contact with the incision fin, the molded portion extending from the outer periphery of the corner section toward an inner periphery of the corner section.

2. A weather strip according to claim 1,
   wherein the molded portion extends continuously along an underside surface of the incision fin, an inside surface of the intermediate portion of the hollow sealing portion, an inside surface of the front portion of the hollow sealing portion and the first surface of the attachment portion.

3. A weather strip according to claim 2,
   wherein the molded portion adjacent the inside surface of the intermediate portion of the hollow sealing portion further comprises a reinforcing rib, the reinforcing rib extending in a generally longitudinal direction along at least a portion of the corner section.

4. A weather strip according to claim 3,
   wherein a rearmost edge of the incision fin extends to the outer periphery of the corner section.

5. A weather strip according to claim 3,
   wherein an exposed portion of the molded portion is formed along a rearmost edge of the incision fin, the exposed portion extending from the rearmost edge of the incision fin to the outer periphery of the corner section.

6. A weather strip according to claim 1,
   wherein the molded portion comprises a concealed portion extending toward an inner periphery of the corner section along a portion of an underside surface of the incision fin and an exposed portion extending from a rearmost edge of the incision fin to the outer periphery of the corner section.

7. A weather strip according to claim 1,
   wherein the flange is provided along a periphery of an opening in an automobile body.

8. A weather strip comprising an extruded body having straight sections and a corner section curving therebetween, the corner section being bounded by an outer periphery and an inner periphery,
   said extruded body comprising an attachment portion and a hollow sealing portion,
   the attachment portion being configured for attachment to a flange,
   the hollow sealing portion comprising
   a front portion, a bottom edge of which is attached adjacent a front edge of a first surface of the attachment portion,
   a rear portion, a bottom edge of which is attached adjacent a rear edge of the first surface of the attachment portion, the orientation of the rear portion being such that it is normally hidden from view when the extruded body is attached to the flange, and
   an intermediate portion disposed between the front portion and the rear portion;
   wherein the corner section of the extruded body further comprises
   a first longitudinal incision having a first end and a second end made in the rear portion of the hollow sealing portion along the corner section, a second longitudinal incision having a first end and a second end made in the front portion of the hollow sealing portion along the corner section, the first and second longitudinal incisions being parallel and of approximately the same length, a first transverse incision made perpendicular to and extending between the first ends of the longitudinal incisions, and a second transverse incision made perpendicular to and extending between the second ends of the longitudinal incisions, to thereby define an excised segment of the hollow sealing portion, the excised segment being removed to expose an inner peripheral fin and an outer fin; and a molded portion comprising a front portion, a bottom edge of which is attached to the inner peripheral fin, a rear portion, a bottom edge of which is attached to the attachment portion adjacent the outer fin, the orientation of the rear portion being such that it is normally hidden from view when the extruded body is attached to the flange, and an intermediate portion extending from the front portion to the outer periphery of the curved portion, the orientation of the intermediate portion being such that it is normally in view when the extruded body is attached to the flange, and a bridge portion extending between the intermediate portion and the rear portion;

wherein the molded portion extends from the outer periphery of the corner section toward the inner periphery of the corner section.

9. A weather strip according to claim 8, wherein the attachment portion defines a U-shaped structure comprising a first side wall, a back wall, and a second side wall that define a cavity for receiving the flange.

10. A weather strip according to claim 9, wherein the attachment portion further comprises a solid rubber composition and a reinforcing insert, the reinforcing insert comprising a material with greater mechanical strength than the solid rubber composition.

11. A weather strip according to claim 10, wherein the reinforcing insert is generally U-shaped and is confined completely within the solid rubber composition comprising the first side wall, back wall, and second side wall of the attachment portion.

12. A weather strip according to claim 11, wherein the attachment portion further comprises a recovery preventing portion, the recovery preventing portion comprising a generally planar structure formed on an exterior surface of the second side wall, the recovery preventing portion being formed in the corner section.

13. A weather strip according to claim 12, wherein the recovery preventing portion comprises a hard polyolefin resin.

14. A weather strip according to claim 13, wherein the attachment portion further comprises a lip portion, the lip portion extending from a portion of the second side wall adjacent a junction of the second side wall and the back wall.

15. A weather strip according to claim 14, wherein the attachment portion further comprises a cover layer, the cover layer being formed on an exterior surface of the lip portion and an exterior surface of the back wall.

16. A weather strip according to claim 15, wherein the cover layer extends continuously along the exterior surface of the lip portion, around an end of the lip portion, and at least a portion of an interior surface of the lip portion.

\* \* \* \* \*